US008901228B2

(12) United States Patent
Noguchi et al.

(10) Patent No.: US 8,901,228 B2
(45) Date of Patent: Dec. 2, 2014

(54) CARBON FIBER COMPOSITE MATERIAL, METHOD OF PRODUCING THE SAME, INSULATING ARTICLE, ELECTRONIC PART, AND LOGGING TOOL

(75) Inventors: Toru Noguchi, Karuizawa-machi (JP); Hiroyuki Ueki, Ueda (JP); Shigeki Inukai, Ueda (JP); Satoshi Iinou, Nagano (JP); Masaei Ito, Sagamihara (JP)

(73) Assignees: Nissin Kogyo Co., Ltd., Ueda-shi (JP); Schlumberger Technology Corporation, Sugar Land, TX (US)

( * ) Notice: Subject to any disclaimer, the term of this patent is extended or adjusted under 35 U.S.C. 154(b) by 974 days.

(21) Appl. No.: 12/648,040

(22) Filed: Dec. 28, 2009

(65) Prior Publication Data

US 2011/0160375 A1    Jun. 30, 2011

(51) Int. Cl.
*C08K 3/04* (2006.01)

(52) U.S. Cl.
CPC ........................... *C08K 3/04* (2013.01)
USPC .......................................... 524/495

(58) Field of Classification Search
CPC ........................................... C08K 3/04
USPC .......................................... 524/495
See application file for complete search history.

(56) References Cited

U.S. PATENT DOCUMENTS

| | | | |
|---|---|---|---|
| 4,923,637 A * | 5/1990 | Yagi et al. | 252/511 |
| 6,280,874 B1 | 8/2001 | Hensley et al. | |
| 6,446,723 B1 | 9/2002 | Ramos et al. | |
| 6,489,025 B2 * | 12/2002 | Morita et al. | 428/367 |
| 6,898,997 B2 | 5/2005 | Oldigs et al. | |
| 7,226,312 B2 | 6/2007 | Shah | |
| 7,259,331 B2 | 8/2007 | Sridhar et al. | |
| 7,438,970 B2 | 10/2008 | Magario et al. | |
| 7,501,459 B2 | 3/2009 | Noguchi et al. | |
| 7,619,029 B1 | 11/2009 | Noguchi et al. | |
| 8,263,698 B2 * | 9/2012 | Noguchi et al. | 524/495 |
| 2004/0241440 A1 | 12/2004 | Noguchi et al. | |
| 2005/0075443 A1 | 4/2005 | Noguchi et al. | |
| 2006/0214560 A1 | 9/2006 | Noguchi et al. | |
| 2007/0100058 A1 | 5/2007 | Noguchi et al. | |
| 2007/0112124 A1 | 5/2007 | Noguchi et al. | |
| 2008/0132635 A1 | 6/2008 | Noguchi et al. | |

(Continued)

FOREIGN PATENT DOCUMENTS

| | | |
|---|---|---|
| JP | A-2008-311083 | 12/2008 |
| JP | A-2009-127038 | 6/2009 |

(Continued)

OTHER PUBLICATIONS

U.S. Appl. No. 11/475,032, filed Jun. 27, 2006 in the name of Toru Noguchi el al.

(Continued)

*Primary Examiner* — Angela C Scott
(74) *Attorney, Agent, or Firm* — Oliff PLC

(57) ABSTRACT

A carbon fiber composite material comprising 100 parts by mass of an elastomer, and 20 to 100 parts by mass of carbon nanofibers that have been oxidized and reduced in number of branch points. The carbon fiber composite material has a dynamic modulus of elasticity (E') at 200° C. and 10 Hz of 10 to 1000 MPa, and a volume resistivity of $10^6$ to $10^{18}$ ohms·cm.

17 Claims, 8 Drawing Sheets

(56) References Cited

U.S. PATENT DOCUMENTS

| | | |
|---|---|---|
| 2008/0167417 A1 | 7/2008 | Noguchi et al. |
| 2008/0223579 A1 | 9/2008 | Goodwin |
| 2009/0000880 A1 | 1/2009 | Noguchi et al. |
| 2009/0151589 A1 | 6/2009 | Henderson et al. |
| 2009/0183941 A1 | 7/2009 | Pabon et al. |
| 2009/0253852 A1 | 10/2009 | Noguchi et al. |
| 2010/0009160 A1 | 1/2010 | Noguchi et al. |
| 2010/0009183 A1 | 1/2010 | Noguchi et al. |
| 2010/0009204 A1 | 1/2010 | Noguchi et al. |

FOREIGN PATENT DOCUMENTS

| | | |
|---|---|---|
| JP | A-2009-215403 | 9/2009 |
| JP | A-2009-275337 | 11/2009 |
| WO | WO 2009/128374 A1 | 10/2009 |

OTHER PUBLICATIONS

U.S. Appl. No. 12/647,898, filed Dec. 28, 2009 in the name of Toru Noguchi et al.

U.S. Appl. No. 12/647,943, filed Dec. 28, 2009 in the name of Toru Noguchi et al.

U.S. Appl. No. 12/647,948, filed Dec. 28, 2009 in the name of Tom Noguchi et al.

International Search Report issued in corresponding International Application No. PCT/JP2009/071907 on Mar. 23, 2010 (with English-language translation).

Jan. 8, 2014 Notification of Reasons for Refusal issued in Japanese Patent Application No. 2011-547231 (with English-language translation).

* cited by examiner

CARBON FIBER COMPOSITE MATERIAL, METHOD OF PRODUCING THE SAME, INSULATING ARTICLE, ELECTRONIC PART, AND LOGGING TOOL

BACKGROUND OF THE INVENTION

The present invention relates to a carbon fiber composite material, a method of producing the same, an insulating article, an electronic part, and a logging tool.

Carbon nanofibers exhibit excellent mechanical properties. Therefore, a carbon nanofiber composite material is expected to be applied to various fields. In particular, since carbon nanofibers exhibit excellent electrical conductivity, a carbon fiber composite material in which carbon nanofibers are uniformly dispersed in an elastomer may be applied to an electron emission device or the like (see JP-A-2008-311083, for example).

A composite material produced by mixing carbon nanofibers into an elastomer exhibits excellent mechanical properties, and is expected to replace a rubber product in various applications. Many rubber products utilize the insulating properties of rubber. On the other hand, a carbon fiber composite material in which carbon nanofibers are uniformly dispersed in an elastomer exhibits excellent electrical conductivity, even if the amount of carbon nanofibers is small. Therefore, it is difficult to apply such a carbon fiber composite material to products for which electrical conductivity is not desired.

SUMMARY

According to a first aspect of the invention, there is provided a carbon fiber composite material comprising 100 parts by mass of an elastomer, and 20 to 100 parts by mass of carbon nanofibers that have been oxidized and reduced in number of branch points, the carbon fiber composite material having a dynamic modulus of elasticity (E') at 200° C. and 10 Hz of 10 to 1000 MPa, and a volume resistivity of $10^6$ to $10^{18}$ ohms·cm.

According to a second aspect of the invention, there is provided an insulating article that is used for oilfield applications, the insulating article comprising the above-described carbon fiber composite material.

According to a third aspect of the invention, there is provided an electronic part comprising the above-described insulating article.

According to a fourth aspect of the invention, there is provided a logging tool comprising a housing, and the above-described electronic part that is disposed in the housing.

According to a fifth aspect of the invention, there is provided a method of producing a carbon fiber composite material comprising:

a step (a) of heating first carbon nanofibers produced by a vapor growth method at a temperature that is within the range of 1100 to 1600° C. and is higher than a reaction temperature employed in the vapor growth method to obtain second carbon nanofibers;

a step (b) of subjecting the second carbon nanofibers to a mechanical process to reduce the number of branch points of the second carbon nanofibers to obtain third carbon nanofibers;

a step (c) of heating the third carbon nanofibers at 600 to 800° C. in an oxygen-containing atmosphere to obtain oxidized fourth carbon nanofibers, and a step (d) of mixing the fourth carbon nanofibers into an elastomer, and uniformly dispersing the fourth carbon nanofibers in the elastomer by applying a shear force to obtain a carbon fiber composite material.

DETAILED DESCRIPTION OF THE EMBODIMENT

Figure 1A:
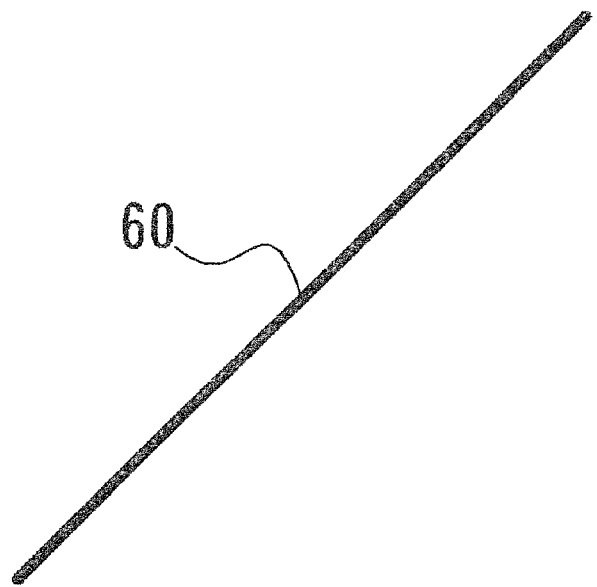
FIGS. 1A to 1D are diagrams schematically illustrating a second carbon nanofiber according to one embodiment of the invention.
Figure 1B:
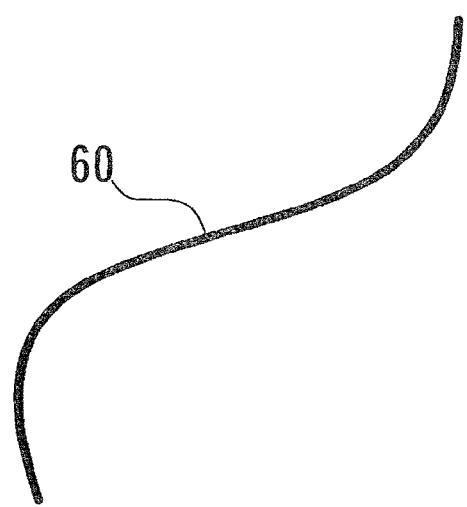

The invention may provide a carbon fiber composite material that has a high volume resistivity, a method of producing the same, an insulating article, an electronic part, and a logging tool.

According to one embodiment of the invention, there is provided a carbon fiber composite material comprising 100 parts by mass of an elastomer, and 20 to 100 parts by mass of carbon nanofibers that have been oxidized and reduced in number of branch points, the carbon fiber composite material having a dynamic modulus of elasticity (E') at 200° C. and 10 Hz of 10 to 1000 MPa, and a volume resistivity of $10^6$ to $10^{18}$ ohms·cm.

In the carbon fiber composite material, the carbon nanofibers may be reduced in number of branch points by a mechanical process before the carbon nanofibers are mixed into the elastomer.

The mechanical process may be implemented by a compression process.

In this case, the elastomer may be a fluoroelastomer, and the carbon fiber composite material may have a dynamic modulus of elasticity (E') at 200° C. and 10 Hz of 15 to 300 MPa, and a volume resistivity of $10^{11}$ to $10^{18}$ ohms·cm.

Alternatively, the elastomer may be an ethylene-propylene rubber, and the carbon fiber composite material may have a dynamic modulus of elasticity (E') at 200° C. and 10 Hz of 10 to 200 MPa, and a volume resistivity of $10^7$ to $10^{18}$ ohms·cm.

The mechanical process may be implemented by a grinding process.

In this case, the elastomer may be an ethylene-propylene rubber, and the carbon fiber composite material may have a dynamic modulus of elasticity (E') at 200° C. and 10 Hz of 10 to 200 MPa, and a volume resistivity of $10^8$ to $10^{18}$ ohms·cm.

In the carbon fiber composite material, the carbon nanofibers may have a maximum fiber length of less than 20 µm.

According to one embodiment of the invention, there is provided an insulating article that is used for oilfield applications, the insulating article comprising the above-described carbon fiber composite material.

According to one embodiment of the invention, there is provided an electronic part comprising the above-described insulating article.

According to one embodiment of the invention, there is provided a logging tool comprising a housing, and the above-described electronic part that is disposed in the housing.

According to one embodiment of the invention, there is provided a method of producing a carbon fiber composite material comprising:

a step (a) of heating first carbon nanofibers produced by a vapor growth method at a temperature that is within the range of 1100 to 1600° C. and is higher than a reaction temperature employed in the vapor growth method to obtain second carbon nanofibers;

a step (b) of subjecting the second carbon nanofibers to a mechanical process to reduce the number of branch points of the second carbon nanofibers to obtain third carbon nanofibers;

a step (c) of heating the third carbon nanofibers at 600 to 800° C. in an oxygen-containing atmosphere to obtain oxidized fourth carbon nanofibers; and a step (d) of mixing the fourth carbon nanofibers into an elastomer, and uniformly dispersing the fourth carbon nanofibers in the elastomer by applying a shear force to obtain a carbon fiber composite material.

In the method of producing a carbon fiber composite material, the heating temperature in the step (a) may be 1200 to 1500° C.

In the method of producing a carbon fiber composite material, the third carbon nanofibers obtained by the step (b) may have a maximum fiber length of less than 20 µm.

In the method of producing a carbon fiber composite material, the mechanical process in the step (b) may be implemented by a compression process, and the third carbon nanofibers obtained by the compression process do not have a branch point.

In the method of producing a carbon fiber composite material, the compression process may be performed by supplying the second carbon nanofibers to a space between at least two rotating rolls, and applying a shear force and a compressive force to the second carbon nanofibers.

In the method of producing a carbon fiber composite material, the compression process is allowed not to use a binder for binding the carbon nanofibers.

In the method of producing a carbon fiber composite material, the compression process may be performed by using a dry compression granulator.

In the method of producing a carbon fiber composite material, the mechanical process in the step (b) may be implemented by a grinding process, and the third carbon nanofibers may have a tap density higher than that of the second carbon nanofibers by a factor of 1.5 to 10.

In the method of producing a carbon fiber composite material, the third carbon nanofibers obtained by the grinding process may have a specific surface area by nitrogen adsorption larger than that of the second carbon nanofibers by a factor of 1.1 to 5.0

In the method of producing a carbon fiber composite material, the grinding process may be a dry grinding process that utilizes an impact and/or a shear force.

In the method of producing a carbon fiber composite material, the surface oxygen concentration of the fourth carbon nanofibers measured by X-ray photoelectron spectroscopy (XPS) may be higher than that of the third carbon nanofibers in an amount of 0.5 to 2.6 atm %.

In the method of producing a carbon fiber composite material, the surface oxygen concentration of the fourth carbon nanofibers measured by X-ray photoelectron spectroscopy (XPS) may be higher than that of the third carbon nanofibers by 20 to 120%.

In the method of producing a carbon fiber composite material, the heating process in the step (c) may reduce the mass of the third carbon nanofibers by 2 to 20% to obtain the fourth carbon nanofibers.

In the method of producing a carbon fiber composite material, the fourth carbon nanofibers obtained by the step (c) may have a surface oxygen concentration measured by X-ray photoelectron spectroscopy (XPS) of 2.6 to 4.6 atm %.

In the method of producing a carbon fiber composite material, the fourth carbon nanofibers obtained by the step (c) may have a ratio (D/G) of a peak intensity D at around 1300 cm$^{-1}$ to a peak intensity G at around 1600 cm$^{-1}$ measured by Raman scattering spectroscopy of 0.12 to 0.22.

In the method of producing a carbon fiber composite material, the fourth carbon nanofibers obtained by the step (c) may have a specific surface area by nitrogen adsorption of 45 to 60 m$^2$/g.

In the method of producing a carbon fiber composite material, the fourth carbon nanofibers obtained by the step (c) may have an average diameter of 70 to 100 nm.

Some embodiments of the invention will be described in detail below.

1. Carbon Nanofibers

The carbon nanofibers are described below.

The fourth carbon nanofibers used in this embodiment may be obtained by the following steps (a) to (c).

In the step (a), untreated first carbon nanofibers produced by the vapor growth method are heated at a temperature that is within the range of 1100 to 1600° C. and is higher than the reaction temperature employed in the vapor growth method to obtain second carbon nanofibers. The heating temperature is preferably 1200 to 1500° C. If the heating temperature in the step (a) is higher than the reaction temperature employed in the vapor growth method, the surface structure of the first carbon nanofibers can be adjusted so that surface defects can be reduced. If the heating temperature is 1100 to 1600° C., the carbon nanofibers exhibit improved surface reactivity with a matrix material (e.g., elastomer) so that nonuniform dispersion of the carbon nanofibers in the matrix material can be suppressed. The second carbon nanofibers thus obtained preferably have a ratio (DIG) of a peak intensity D at around 1300 cm$^{-1}$ to a peak intensity G at around 1600 cm$^{-1}$ measured by Raman scattering spectroscopy of more than 1.25 and less than 1.6. In the Raman spectrum of the second carbon nanofibers, the peak intensity D at around 1300 cm$^{-1}$ is attributed to defects in the crystal that forms the carbon nanofibers, and the peak intensity G at around 1600 cm$^{-1}$ is attributed to the crystal that forms the carbon nanofibers. Therefore, the smaller the ratio (DIG) of the peak intensity D to the peak intensity the higher the degree of crystallization of the carbon nanofibers. Accordingly, the smaller the ratio (DIG) of the peak intensity D to the peak intensity C, the higher the degree of graphitization of the carbon nanofibers (i.e., the number of surface defects is small). Therefore, the second carbon nanofibers having the ratio (DIG) of the peak intensity D to the peak intensity G within the above range appropriately have non-crystalline portions on the surface to exhibit excellent wettability with the elastomer. Moreover, since the number of defects is relatively small, the second carbon nanofibers exhibit sufficient strength. The first carbon nanofibers that are not subjected to a heat treatment, a compression process, and the like in the steps (a) to (c) are untreated carbon nanofibers produced by the vapor growth method. The untreated first carbon nanofibers produced by the vapor growth method are normally heated (graphitized (crystallized)) at 2000 to 3200° C. in an inert gas atmosphere to remove impurities (e.g., amorphous products deposited on the surface of the first carbon nanofibers during vapor growth, and residual metal catalyst). In this embodiment, the first carbon nanofibers are heated in the step (a) at a temperature of 1100 to 1600° C. that is sufficiently lower than the graphitization temperature to obtain the second carbon nanofibers without performing the graphitization treatment. A carbon fiber composite material produced using the second carbon nanofibers that appropriately have an amorphous portion on the surface has a volume resistivity higher than that of a carbon fiber composite material produced using graphitized carbon nanofibers.

The vapor growth method is also referred to as catalytic chemical vapor deposition (CCVD). The vapor growth method pyrolyzes a gas (e.g., hydrocarbon) in the presence of a metal catalyst to produce untreated first carbon nanofibers. As the vapor growth method, a floating reaction method that introduces an organic compound (e.g., benzene or toluene) (i.e., raw material) and an organotransition metal compound (e.g., ferrocene or nickelocene) (i.e., metal catalyst) into a reaction furnace set at a high temperature (e.g., 400 to 1000° C.) together with a carrier gas to produce first carbon nanofibers that are in a floating state or deposited on the wall of the reaction furnace, a substrate reaction method that causes metal-containing particles supported on a ceramic (e.g., alumina or magnesium oxide) to come in contact with a carbon-containing compound at a high temperature to produce first carbon nanofibers on a substrate, or the like may be used. The untreated first carbon nanofibers produced by the vapor growth method may have an average diameter of 70 to 100 nm. The first carbon nanofiber may have an aspect ratio of 50 to 200. The average diameter and the average length of the carbon nanofibers may be determined by measuring the diameter and the length of the carbon nanofibers at 200 or more locations from an image photographed using an electron microscope at a magnification of 5000 (the magnification may be appropriately changed depending on the size of the carbon nanofibers), and calculating the arithmetic mean values of the diameter and the length of the carbon nanofibers.

The first carbon nanofibers produced by the vapor growth method may be carbon nanotubes or the like. The carbon nanotube has a structure in which a graphite hexagonal carbon layer is rolled in one or more layers. A carbon material having a partial carbon nanotube structure may also be used. The carbon nanotube may also be referred to as a graphite fibril nanotube or a vapor-grown carbon fiber.

FIGS. 1A to 1D are diagrams schematically illustrating the second carbon nanofiber according to one embodiment of the invention.

Figure 1C:
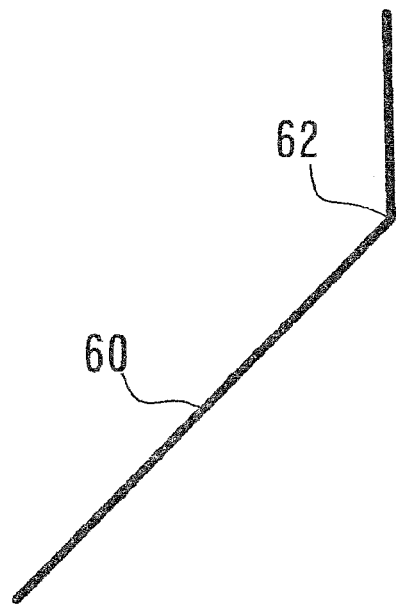
Figure 1D:
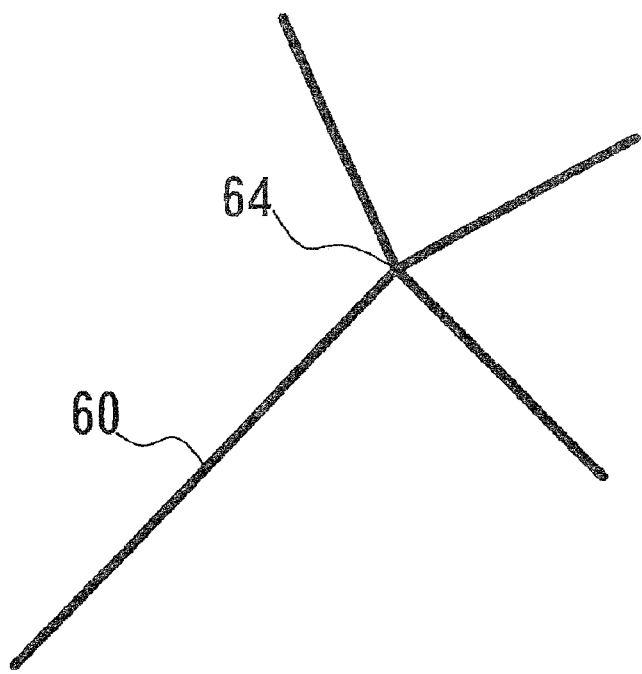

A second carbon nanofiber 60 has almost the same structure as the untreated first carbon nanofiber produced by the vapor growth method, and is preferably linear along the longitudinal direction (see FIG. 1A). However, the second carbon nanofiber 60 may be curved (see FIG. 1B), bent at a bend point 62 (see FIG. 1C), or branch at a branch point 64 in a plurality of (four in FIG. 1D) directions (see FIG. 1D). It is considered that the flexibility and the durability of a composite material can be improved when the second carbon nanofibers 60 contained in the composite material are linear (see FIG. 1A). On the other hand, a stress concentration may occur at the bend point 62 or the branch point 64 when the second carbon nanofiber 60 shown in FIG. 1C or 1D is contained in the composite material, so that the reinforcing performance of the second carbon nanofibers in the composite material may decrease. Note that the bend point 62 shown in FIG. 1C is not present when the second carbon nanofiber 60 is curved (see FIG. 1B).

In the step (b), the second carbon nanofibers obtained by the step (a) are subjected to a mechanical process to reduce the number of branch points of the second carbon nanofibers to obtain third carbon nanofibers.

The mechanical process in the step (b) may be implemented by a compression process or a grinding process.

The step (b) that utilizes the compression process is described below.

Figure 2:
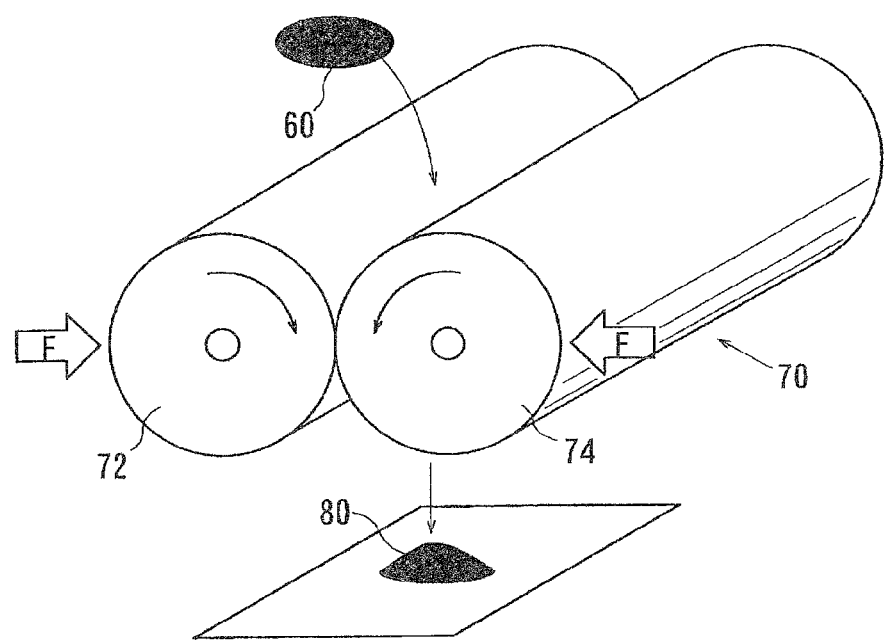
FIG. 2 is a perspective view schematically illustrating a compression process performed in a step (b) according to one embodiment of the invention.

The third carbon nanofibers obtained by the compression process in the step (b) may not have a branch point. In the compression process in the step (b), a high pressure is required to cut the second carbon nanofibers at least at the branch point. The step (b) is described in detail below with reference to FIG. 2. FIG. 2 is a perspective view schematically illustrating the step (b) according to one embodiment of the invention. As illustrated in FIG. 2, the compression process may be performed using a dry compression granulator 70 (e.g., roll press machine or roller compactor). Specifically, the second carbon nanofibers 60 (i.e., raw material) are supplied to the space between a plurality of (e.g., two) rolls 72 and 74 that are continuously rotated in the arrow directions in FIG. 2, and compressed by applying a shear force and a compressive force to the carbon nanofibers. Aggregates of third carbon nanofibers 80 can be obtained by supplying the second carbon nanofibers 60 obtained by the step (a) to the dry compression granulator 70, and compressing the second carbon nanofibers 60. A roll press machine normally utilizes a flat roll that does not have a pocket formed in the outer circumferential surface, a roll that has a pocket formed in the outer circumferential surface, or the like. In this embodiment, a flat roll may be used to evenly apply a compressive force to the second carbon nanofibers. The distance between the rolls is set to 0 mm (i.e., the rolls come in contact with each other). A given compressive force F (e.g., 980 to 2940 N/cm) may be applied between the rolls. It is preferable to apply a compressive force F of 1500 to 2500 N/cm between the rolls. The compressive force F may be appropriately set while checking the presence or absence of a branch point in the aggregates of the carbon nanofibers using an electron microscope or the like. If the compressive force F is 980 N/cm or more, the second carbon nanofiber having a branch point can be cut at the branch point. The compression process may be performed a plurality of times (e.g., twice) so that the entire carbon nanofibers are homogenized (uniformly compressed). A granulator generally utilizes a binder (e.g., water) in order to bind a powder. The compression process according to this embodiment may utilize a dry granulation process that does not use a binder for binding the third carbon nanofibers. Specifically, since use of a binder may make it difficult to disperse the fourth carbon nanofibers in the subsequent step, a binder removal step may be additionally required.

After forming the plate-like (flake-like) aggregates of the carbon nanofibers 80 by compressing the carbon nanofibers between the rolls of the dry compression granulator 70, the size of the aggregates of the carbon nanofibers 80 may be adjusted to a desired value by grinding the aggregates of the carbon nanofibers 80 using a grinder or the like. For example, the aggregates of the carbon nanofibers 80 may be ground (crushed) by applying a shear force by rotating a rotary knife of a grinder at a high speed, and only aggregates of the carbon nanofibers 80 having a size equal to or less than an appropriate size may be screened. The aggregates of the carbon nanofibers 80 subjected to only the compression process differ in size to a large extent. However, since the size of the aggregates of the carbon nanofibers 80 can be adjusted to an appropriate value by thus grinding the aggregates of the carbon nanofibers 80, non-uniform distribution of the aggregates of the carbon nanofibers can be prevented when mixing the aggregates of the carbon nanofibers with the matrix material. The third carbon nanofibers are cut at the branch point by the compression process so that the desired bulk density is achieved (i.e., handling during processing is facilitated). For example, the carbon nanofibers can be granulated to plate-like aggregates of the third carbon nanofibers.

Figure 3:
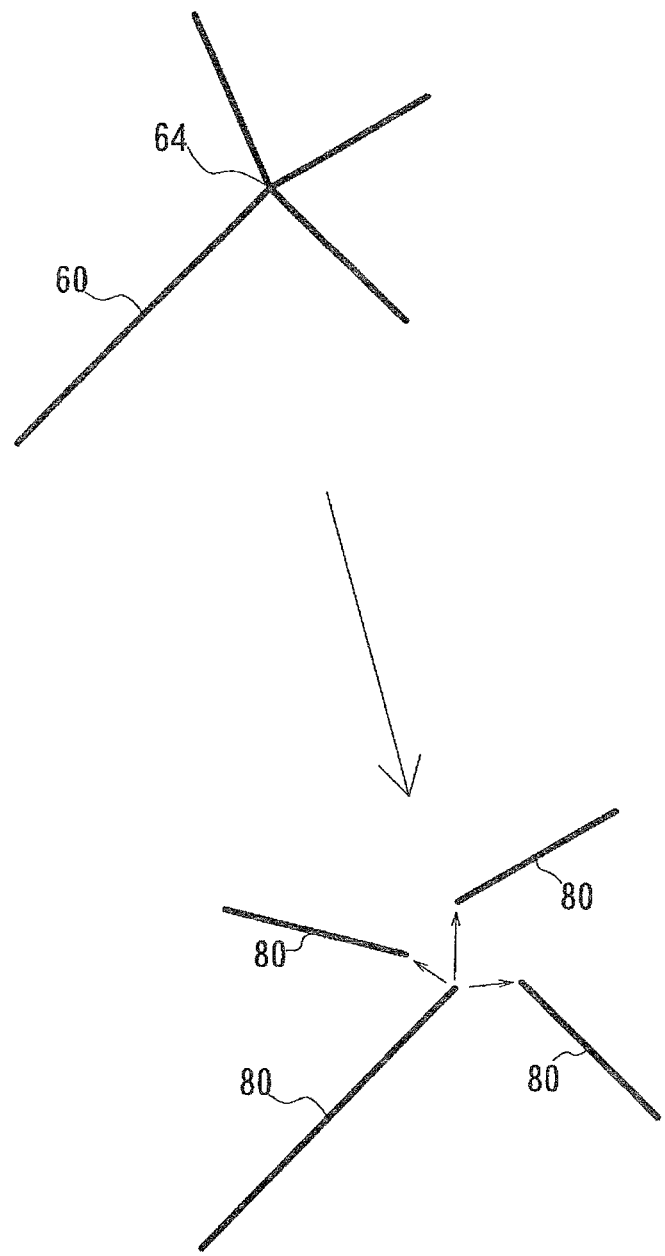
FIG. 3 is a diagram schematically illustrating a second carbon nanofiber and a third carbon nanofiber according to one embodiment of the invention.

The third carbon nanofibers obtained by the compression process are described in detail below with reference to FIG. 3. FIG. 3 is a diagram schematically illustrating the third carbon nanofibers according to one embodiment of the invention.

As illustrated in FIG. 3, the second carbon nanofiber 60 (upper left) having the branch point 64 is cut at the branch point 64 by the compression process to obtain four third carbon nanofibers 80 (lower right), for example. Therefore, the third carbon nanofibers 80 have a reduced number of branch points 64 as compared with the second carbon nanofibers 60. In particular, the branch point 64 may not be observed using an electron microscope. If the third carbon nanofibers do not have a branch point, the dispersibility of the fourth carbon nanofibers in a composite material can be improved when mixing the fourth carbon nanofibers obtained by the step (c) with other materials. Moreover, the flexibility and the durability of the composite material can be improved. Since the fourth carbon nanofibers do not have a branch point, a stress concentration at a branch point does not occur when mixing the fourth carbon nanofibers into a composite material. This prevents a deterioration in performance of the fourth carbon nanofibers as a reinforcing material. Since the second carbon nanofibers having the bend point 62 shown in FIG. 1C are also cut at the bend point 62, the number of third carbon nanofibers having a defect (e.g., bend point 62 or branch point 64) can be reduced. The percentage of third carbon nanofibers having the bend point 62 included in the third carbon nanofibers obtained by the compression process may be less than 10%. If the percentage of third carbon nanofibers having the bend point 62 included in the third carbon nanofibers obtained by the compression process is 10% or more, a defect may not have been sufficiently removed by the compression process. The third carbon nanofibers 80 having a reduced number of defects (e.g., bend point 62 or branch point 64) may have a maximum fiber length of less than 20 μm. In recent years, carbon nanofibers having a maximum fiber length of less than 20 or 15 μm may be desired. For example, when the third carbon nanofibers have a maximum fiber length of less than 20 μm, the flexibility of a composite material that contains the fourth carbon nanofibers can be improved. The third carbon nanofiber 80 may have a bulk density of 0.15 to 0.3 g/cm$^3$. If the bulk density is 0.15 to 0.3 g/cm$^3$, the third carbon nanofibers 80 are rarely scattered, and exhibit excellent handling capability during storage, transportation, or mixing. The term "bulk density" used herein refers to a value obtained by pouring the carbon nanofibers into a cylindrical container (1000 cm$^3$), measuring the mass of the carbon nanofibers, and calculating the bulk density (g/cm$^3$) of the carbon nanofibers in accordance with JIS K 6219-2 (Carbon black for rubber industry—Determination of granulated particles—Part 2: Measurement of bulk density). The third carbon nanofibers 80 obtained by the compression process may be granulated into plate-shaped aggregates of the third carbon nanofibers. Since the third carbon nanofibers 80 can be handled as plate-shaped aggregates, the handling capability during storage, transportation, or mixing can be improved.

The step (b) that utilizes the grinding process is described below.

The tap density of the third carbon nanofibers obtained by the grinding process in the step (b) may be higher than that of the second carbon nanofibers obtained by the step (a) by a factor of 1.5 to 10. The step (b) may cause the third carbon nanofibers to have a specific surface area by nitrogen adsorption larger than that of the second carbon nanofibers that are not subjected to the grinding process by a factor of 1.1 to 5.0. Carbon nanofibers that exhibit improved surface reactivity and wettability with the matrix material (e.g., elastomer) can be produced by the step (b).

The second carbon nanofibers have a defect (e.g., a branch point at which the fiber branches, or a bend point at which the fiber is bent). Such a defect is reduced by the grinding process since the second carbon nanofibers break at the branch point or the bend point. Moreover, the surface of the carbon nanofibers is activated. Since the number of branch points and bend points of the carbon nanofibers is thus reduced, the strength of each fiber is improved. Moreover, since the second carbon nanofibers are ground so that the fiber length is reduced to only a small extent, the properties of the composite material produced using the resulting carbon nanofibers are improved. Since the surface of the carbon nanofibers is activated, the carbon nanofibers exhibit improved surface reactivity with the matrix material, so that nonuniform dispersion of the carbon nanofibers in the composite material can be suppressed. The step (b) may be performed by a dry grinding process that utilizes an impact and/or a shear force. The carbon nanofibers may be dry-ground in the absence of water and/or an organic solvent, for example. When the carbon nanofibers are dry-ground, a post-process including removing a dispersant after grinding, drying a solvent, and disentangling the dried and entangled fibers is unnecessary. The carbon nanofibers may be dry-ground at a peripheral velocity of 50 to 200 m/s for 0.5 to 60 minutes. A high-speed rotary mill, a ball mill, a medium stirring mill, a jet grinder, or the like may be used to dry-grind the carbon nanofibers. It is preferable to use a vibrating ball mill (e.g., rotary grinder, circular vibrating mill, or centrifugal mill) that crushes the fibers utilizing an impact force.

The grinding process thus causes the second carbon nanofibers having a branch point to be cut at the branch point in the same manner as the compression process, so that the number of branch points can be reduced. Therefore, the third carbon nanofibers subjected to the grinding process have a reduced number of branch points as compared with the second carbon nanofibers. In particular, a branch point may not be observed using an electron microscope.

The tap density of the third carbon nanofibers subjected to the grinding process may be higher than that of the second carbon nanofibers that are not subjected to the grinding process by a factor of 1.5 to 10. The wettability of the carbon nanofibers with the matrix material (e.g., elastomer) can be improved by such a moderate grinding process without reducing the lengths of the second carbon nanofibers to a large extent. The third carbon nanofibers subjected to the grinding process may have a tap density of 0.03 to 0.2 g/cm$^3$. The term "tap density" refers to an apparent density measured by a tap method, and indicates the bulkiness of the third carbon nanofibers. Therefore, when the number of branch points and defects of the third carbon nanofibers is reduced by the grinding process, the filling density increases so that the tap density tends to increase. The third carbon nanofibers subjected to the grinding process and having a tap density within the above range may exhibit excellent wettability with the matrix material (e.g., elastomer).

The specific surface area by nitrogen adsorption of the third carbon nanofibers subjected to the grinding process may be larger than that of the second carbon nanofibers that are not subjected to the grinding process by a factor of 1.1 to 5.0. The number of contact points between the matrix material and the third carbon nanofibers increases due to an increase in specific surface area by nitrogen adsorption, so that the third carbon nanofibers are easily dispersed in the matrix material. The third carbon nanofibers subjected to the grinding process preferably have a specific surface area by nitrogen adsorption of 22 to 100 $m^2/g$. The third carbon nanofibers subjected to the grinding process and having a specific surface area by nitrogen adsorption within the above range may exhibit excellent wettability with the matrix material (e.g., elastomer).

In the step (c), the third carbon nanofibers obtained by the step (b) are heated at 600 to 800° C. in an oxygen-containing atmosphere to obtain oxidized fourth carbon nanofibers.

For example, the third carbon nanofibers are placed in a furnace containing air, and heated at a given temperature within the range of 600 to 800° C. to obtain fourth carbon nanofibers of which the surface has been oxidized to a desired oxygen concentration. The heating time (i.e., the period of time in which the third carbon nanofibers are held in the heat treatment furnace at a given temperature) in the step (c) may be 10 to 180 minutes, for example. The oxygen-containing atmosphere may be an ambient atmosphere, an oxygen atmosphere, or an atmosphere of which the oxygen concentration is appropriately set. The amount of oxygen introduced into the heat treatment furnace may be appropriately adjusted depending on the internal volume of the heat treatment furnace and the amount of third carbon nanofibers subjected to the oxidation treatment. It suffices that the atmosphere have an oxygen concentration sufficient for the surface of the fourth carbon nanofibers to be oxidized to a desired oxygen concentration by the step (c). The heating temperature may be appropriately set within the range of 600 to 800° C. so that the desired oxidation treatment is achieved. The third carbon nanofibers are normally burnt and damaged to a large extent at about 800° C. Therefore, it is desirable to carefully set the heating temperature and the heating time through repeated experiments. Note that the heating temperature and the heating time may be appropriately adjusted depending on the oxygen concentration in the furnace used for the step (c), the internal volume of the furnace, the amount of third carbon nanofibers subjected to the oxidation treatment, and the like. The term "heating temperature" used herein refers to the temperature of the atmosphere inside the heat treatment furnace.

The step (c) may be performed so that the surface oxygen concentration of the fourth carbon nanofibers measured by X-ray photoelectron spectroscopy (XPS) is higher than that of the third carbon nanofibers in an amount of 0.5 to 2.6 atm %. When the mechanical process in the step (b) is implemented by the compression process, the surface oxygen concentration of the fourth carbon nanofibers may be higher than that of the third carbon nanofibers in an amount of 0.9 to 2.6 atm %, and preferably 1.0 to 2.6 atm %. When the mechanical process in the step (b) is implemented by the grinding process, the surface oxygen concentration of the fourth carbon nanofibers may be higher than that of the third carbon nanofibers in an amount of 0.9 to 1.9 atm %, and preferably 1.0 to 1.6 atm %. The step (c) may be performed so that the surface oxygen concentration of the fourth carbon nanofibers measured by X-ray photoelectron spectroscopy (XPS) is higher than that of the third carbon nanofibers by 20 to 120%. When the mechanical process in the step (b) is implemented by the compression process, the surface oxygen concentration of the fourth carbon nanofibers may be higher than that of the third carbon nanofibers by 60 to 120%. When the mechanical process in the step (b) is implemented by the grinding process, the surface oxygen concentration of the fourth carbon nanofibers may be higher than that of the third carbon nanofibers by 43 to 90%, and preferably 48 to 76%. The surface oxygen concentration of the fourth carbon nanofibers obtained by the step (c) measured by X-ray photoelectron spectroscopy (XPS) may be 2.6 to 4.6 atm %. When the mechanical process in the step (b) is performed by the compression process, the surface oxygen concentration of the fourth carbon nanofibers may be 3.0 to 4.6 atm %, and preferably 3.1 to 4.6 atm %. When the mechanical process in the step (b) is performed by the grinding process, the surface oxygen concentration of the fourth carbon nanofibers may be 3.0 to 4.0 atm %, and preferably 3.1 to 3.7 atm %. Specifically, since the third carbon nanofibers have a moderately oxidized surface, the surface reactivity of the fourth carbon nanofibers with the elastomer can be improved, so that the dispersibility of the carbon nanofibers in the elastomer can be improved.

The fourth carbon nanofibers oxidized in the step (c) may be reduced in mass as compared with the third carbon nanofibers by 2 to 20%, for example. If the reduction in mass is within this range, it is considered that the fourth carbon nanofibers are moderately oxidized. If the fourth carbon nanofibers have been reduced in mass as compared with the third carbon nanofibers by less than 2%, the surface oxygen concentration of the fourth carbon nanofibers is low, so that an improvement in wettability may be insufficient. On the other hand, the fourth carbon nanofibers that have been reduced in mass as compared with the third carbon nanofibers by more than 20% merely exhibit almost the same wettability as that of the fourth carbon nanofibers that have been reduced in mass by 20% or less (i.e., the carbon nanofibers are unnecessarily lost). Moreover, it may be uneconomical with respect to the energy consumption of the heat treatment. Specifically, when the surface of the third carbon nanofibers is oxidized, carbon on the surface of the third carbon nanofibers is unnecessarily vaporized as carbon dioxide. It is considered that the fiber length of the carbon nanofibers is reduced to only a small extent when the fourth carbon nanofibers are not reduced in mass as compared with the third carbon nanofibers by more than 20%. The surface oxygen concentration of the fourth carbon nanofibers may be analyzed by X-ray photoelectron spectroscopy (XPS). The oxygen concentration is preferably analyzed by XPS after subjecting the fourth carbon nanofibers to an argon gas etching treatment for 0.5 to 1.0 minutes to remove impurities that adhere to the surface of the fourth carbon nanofibers to expose the surface of the fourth carbon nanofibers, for example. The argon gas concentration employed in the argon gas etching treatment may be $5 \times 10^{-2}$ to $20 \times 10^{-2}$ Pa. When analyzing the surface oxygen concentration by XPS, a carbon tape (i.e., conductive adhesive) may be bonded to a metal stage of an XPS apparatus, the fourth carbon nanofibers may be sprinkled over and caused to adhere to the carbon tape, the fourth carbon nanofibers that do not adhere to the carbon tape may be removed, and the oxygen concentration may then be analyzed, for example. Specifically, the surface oxygen concentration of the fourth carbon nanofibers may be analyzed by XPS while allowing the fourth carbon nanofibers to be in a powder-like state without pressing the fourth carbon nanofibers on the carbon tape to have a block-like form. The surface oxygen concentration of the third carbon nanofibers may be similarly measured by XPS.

The fourth carbon nanofibers obtained by the step (e) may have a ratio (DIG) of the peak intensity D at around 1300 $cm^{-1}$ to the peak intensity G at around 1600 $cm^{-1}$ measured by Raman scattering spectroscopy of 0.12 to 0.22. The fourth carbon nanofibers have a Raman peak ratio (DIG) larger than that of the third carbon nanofibers due to an increase in the number of crystal defects on the surface of the fourth carbon nanofibers. The fourth carbon nanofibers have been preferably oxidized so that the fourth carbon nanofibers have a Raman peak ratio (DIG) larger than that of the third carbon nanofibers by 0.02 or more. The fourth carbon nanofibers may have a specific surface area by nitrogen adsorption of 34 to 58 $m^2/g$. The specific surface area by nitrogen adsorption of the fourth carbon nanofibers is larger than that of the third carbon nanofibers due to surface roughness. The fourth carbon nanofibers have been preferably oxidized so that the fourth carbon nanofibers have a specific surface area by nitrogen adsorption larger than that of the third carbon nanofibers by 9 $m^2/g$ or more. The average diameter of the fourth carbon nanofibers used in the step (c) is almost equal to that of the first carbon nanofibers. The fourth carbon nanofibers produced by the vapor growth method may have an average diameter of 70 to 100 nm. The surface reactivity and the wettability with the elastomer can be improved by utilizing the fourth carbon nanofibers, so that a carbon fiber composite material that has a high volume resistivity and exhibits excellent electrical insulating properties can be obtained. The amount of the fourth carbon nanofibers mixed into the elastomer may be adjusted depending on the application. Since the wettability of the fourth carbon nanofibers with the elastomer has been improved, the amount of the fourth carbon nanofibers can be reduced when producing a carbon fiber composite material having a given rigidity, for example.

2. Elastomer

The elastomer used in the method of producing a carbon fiber composite material is described below.

The elastomer may have a weight average molecular weight of 5000 to 5,000,000, and preferably 20,000 to 3,000,000. If the molecular weight of the elastomer is within the above range, the elastomer molecules are entangled and linked. Therefore, the elastomer exhibits excellent elasticity that allows the fourth carbon nanofibers to be dispersed. Since the elastomer has viscosity, the elastomer easily enters the space between the aggregated fourth carbon nanofibers. Moreover, since the elastomer has elasticity, the fourth carbon nanofibers can be separated. The network component of the elastomer in uncrosslinked form may have a spin-spin relaxation time (T2n/30° C.), measured for $^1H$ at 30° C. by the Hahn-echo method using the pulsed NMR technique, of 100 to 3000 μsec, and preferably 200 to 1000 μsec. If the elastomer has a spin-spin relaxation time (T2n130° C.) within the above range, the elastomer is flexible and has sufficiently high molecular mobility (i.e., has elasticity sufficient to disperse the fourth carbon nanofibers). Since the elastomer has viscosity, the elastomer can easily enter the space between the fourth carbon nanofibers due to high molecular motion when mixing the elastomer and the fourth carbon nanofibers. The network component of the elastomer in a crosslinked form may have a spin-spin relaxation time (T2n), measured for $^1H$ at 30° C. by the Hahn-echo method using the pulsed NMR technique, of 100 to 2000 pee. The reasons therefor are the same as described for the uncrosslinked form. Specifically, when crosslinking the elastomer in uncrosslinked form satisfying the above conditions, the spin-spin relaxation time (T2n) of the resulting elastomer in crosslinked form almost falls within the above range.

The spin-spin relaxation time determined by the Hahn-echo method using the pulsed NMR technique is a measure that indicates the molecular mobility of a material. Specifically, when measuring the spin-spin relaxation time of the elastomer by the Hahn-echo method using the pulsed NMR technique, a first component having a shorter first spin-spin relaxation time (T2n) and a second component having a longer second spin-spin relaxation time (T2nn) are detected. The first component corresponds to the network component (backbone molecule) of the polymer, and the second component corresponds to the non-network component (branched component such as a terminal chain) of the polymer. The shorter the first spin-spin relaxation time, the lower the molecular mobility and the harder the elastomer. The longer the first spin-spin relaxation time, the higher the molecular mobility and the softer the elastomer. As the measurement method using the pulsed NMR technique, a solid-echo method, a Carr-Purcell-Meiboom-Gill (CPMG) method, or a 90-degree pulse method may be used instead of the Hahn-echo method. Since the elastomer according to the invention has a medium spin-spin relaxation time (T2), the Hahn-echo method is most suitable. In general, the solid-echo method and the 90-degree pulse method are suitable for measuring a short spin-spin relaxation time (T2), the Hahn-echo method is suitable for measuring a medium spin-spin relaxation time (T2), and the CPMG method is suitable for measuring a long spin-spin relaxation time (T2).

At least one of the main chain, the side chain, and the terminal chain of the elastomer includes an unsaturated bond or a group having affinity to the carbon nanofibers (particularly to a terminal radical of the carbon nanofiber), or the elastomer readily produces such a radical or group. The unsaturated bond or group may be at least one unsaturated bond or group selected from a double bond, a triple bond, and functional groups such as a carbonyl group, a carboxyl group, a hydroxyl group, an amino group, a nitrile group, a ketone group, an amide group, an epoxy group, an ester group, a vinyl group, a halogen group, a urethane group, a biuret group, an allophanate group, and a urea group. In this embodiment, since at least one of the main chain, the side chain, and the terminal chain of the elastomer includes an unsaturated bond or a group having high affinity (reactivity or polarity) to the radical of the carbon nanofiber, the elastomer and the fourth carbon nanofibers can be bonded. This makes it possible to easily disperse the fourth carbon nanofibers against cohesive force. When mixing the elastomer and the fourth carbon nanofibers, free radicals are produced by breakage of the elastomer molecules, and attack a defect of the fourth carbon nanofibers to produce radicals on the surface of the fourth carbon nanofibers.

As the elastomer, an elastomer such as natural rubber (NR), epoxidized natural rubber (ENR), styrene-butadiene rubber (SBR), nitrile rubber (NBR), chloroprene rubber (CR), ethylene propylene rubber (EPR or EPDM), butyl rubber (IIR), chlorobutyl rubber (CIIR), acrylic rubber (ACM), silicone rubber (Q), fluorine rubber (FKM), perfluoro elastomer (FFKM), butadiene rubber (BR), epoxidized butadiene rubber (EBR), epichlorohydrin rubber (CO or CEO), urethane rubber (U), or polysulfide rubber (T); a thermoplastic elastomer such as an olefin-based elastomer (TPO), a polyvinyl chloride-based elastomer (TPVC), a polyester-based elastomer (TPEE), a polyurethane-based elastomer (TPU), a polyamide-based elastomer (TPEA), or a styrene-based elastomer (SBS), or a mixture of thereof may be used. It is preferable to use a highly polar elastomer (e.g., natural rubber (NR) or nitrite rubber (NBR)) that readily produces free radicals when mixing the elastomer. An elastomer having a low polarity (e.g., ethylene-propylene rubber (EPDM)) may also be used in the invention, since such an elastomer also produces free radicals when the mixing temperature is adjusted to a relatively high temperature (e.g., 50° C. to 150° C. for EPDM). Note that a carbon fiber composite material having a relatively high volume resistivity can be obtained by mixing the fourth carbon nanofibers into a fluoroelastomer (e.g., fluororubber). The elastomer may be a rubber elastomer or a thermoplastic elastomer. When using a rubber elastomer, the elastomer may be in crosslinked form or uncrosslinked form. Note that it is preferable to use an elastomer in uncrosslinked form.

3. Method of Producing Carbon Fiber Composite Material

A method of producing a carbon fiber composite material according to one embodiment of the invention includes a step (a) of heating first carbon nanofibers produced by a vapor growth method at a temperature that is within the range of 1100 to 1600° C. and is higher than a reaction temperature employed in the vapor growth method to obtain second carbon nanofibers, a step (b) of subjecting the second carbon nanofibers to a mechanical process to reduce the number of branch points of the second carbon nanofibers to obtain third carbon nanofibers, a step (c) of heating the third carbon nanofibers at 600 to 800° C. in an oxygen-containing atmosphere to obtain oxidized fourth carbon nanofibers, and a step (d) of mixing the fourth carbon nanofibers into an elastomer, and uniformly dispersing the fourth carbon nanofibers in the elastomer by applying a shear force to obtain a carbon fiber composite material. The steps (a) to (c) are the same as those described in the section entitled "1. Carbon nanofibers". The step (d) is described in detail below with reference to FIGS. 4 to 6.

Figure 4:
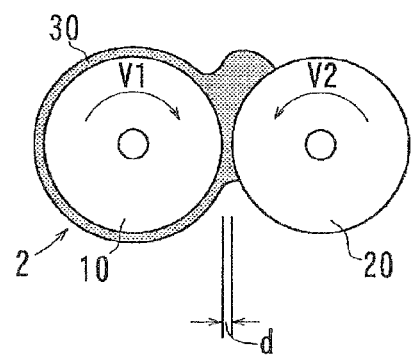
FIG. 4 is a diagram schematically illustrating a step (d) according to one embodiment of the invention that utilizes an open-roll method.
Figure 5:
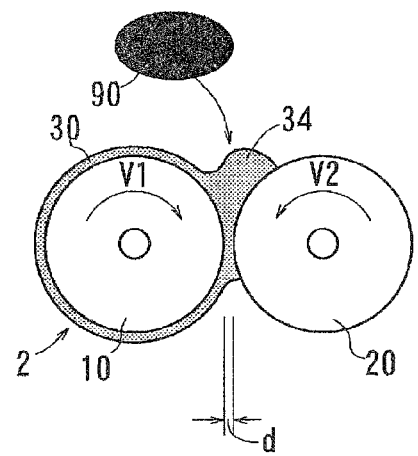
FIG. 5 is a diagram schematically illustrating a step (d) according to one embodiment of the invention that utilizes an open-roll method.
Figure 6:
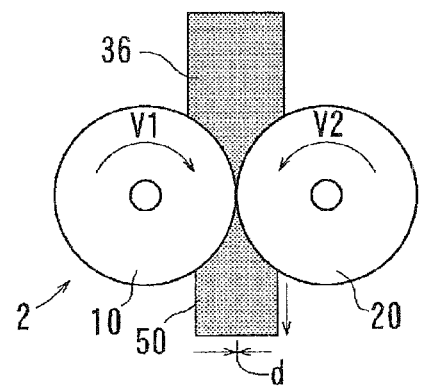
FIG. 6 is a diagram schematically illustrating a step (d) according to one embodiment of the invention that utilizes an open-roll method.

FIGS. 4 to 6 are diagrams schematically illustrating the step (d) according to one embodiment of the invention that utilizes an open-roll method. As illustrated in FIGS. 4 to 6, a first roll 10 and a second roll 20 of a two-roll open roll 2 are disposed at a given distance d (e.g., 0.5 to 1.5 mm). The first roll 10 and the second roll 20 are respectively rotated at rotation speeds V1 and V2 in the directions indicated by arrows in FIGS. 4 to 6, or in the reverse directions.

As illustrated in FIG. 4, an elastomer 30 that is wound around the first roll 10 is masticated so that the molecular chains of the elastomer are moderately cut to produce free radicals. The free radicals of the elastomer produced by mastication are easily bonded to the fourth carbon nanofibers obtained by the step (c).

As illustrated in FIG. 5, fourth carbon nanofibers 90 are supplied to a bank 34 of the elastomer 30 wound around the first roll 10, and the elastomer 30 and the fourth carbon nanofibers 90 are mixed. The elastomer 30 and the fourth carbon nanofibers 90 may be mixed using an internal mixing method, a multi-screw extrusion kneading method, or the like instead of the open-roll method.

As illustrated in FIG. 6, the distance d between the first roll 10 and the second roll 20 may be set to 0.5 mm or less, and preferably 0 to 0.5 mm. A mixture 36 is then supplied to the open roll 2, and tight-milled one or more times. The mixture 36 may be tight-milled about one to ten times, for example. When the surface velocity of the first roll 10 is referred to as V1, and the surface velocity of the second roll 20 is referred to as V2, the surface velocity ratio (V1/V2) of the first roll 10 to the second roll 20 during tight milling may be 1.05 to 3.00, and is preferably 1.05 to 1.2. A desired shear force can be applied by utilizing such a surface velocity ratio. A carbon fiber composite material 50 that is extruded through the narrow space between the rolls is deformed to a large extent as a result of the restoring force of the elastomer 30 due to elasticity (see FIG. 6), so that the fourth carbon nanofibers 90 move together with the elastomer 30. The carbon fiber composite material 50 obtained by tight milling is rolled (sheeted) by the rolls to a given thickness. The tight milling step may be performed while setting the roll temperature at a relatively low temperature (e.g., 0 to 50° C., and preferably 5 to 30° C.) in order to obtain as high a shear force as possible. The temperature of the elastomer 30 may also be adjusted to 0 to 50° C. This causes a high shear force to be applied to the elastomer 30 so that the aggregated fourth carbon nanofibers 90 are separated by the molecules of the elastomer 30 one by one, and become dispersed in the elastomer 30. In particular, since the elastomer 30 has elasticity, viscosity, and chemical interaction with the fourth carbon nanofibers 90, the fourth carbon nanofibers 90 are easily dispersed in the elastomer 30. A carbon fiber composite material 50 in which the fourth carbon nanofibers 90 exhibit excellent dispersibility and dispersion stability (i.e., the fourth carbon nanofibers 90 rarely re-aggregate) can thus be obtained.

Specifically, when mixing the elastomer and the fourth carbon nanofibers using the open roll, the viscous elastomer enters the space between the fourth carbon nanofibers, and specific portions of the elastomer are bonded to highly active sites of the fourth carbon nanofibers through chemical interaction. When the fourth carbon nanofibers have a moderately active surface due to the oxidation treatment or the like, the fourth carbon nanofibers are easily bonded to the molecules of the elastomer. When a high shear force is then applied to the elastomer, the fourth carbon nanofibers move along with the movement of the molecules of the elastomer, so that the aggregated fourth carbon nanofibers are separated by the restoring force of the elastomer due to elasticity after shearing, and become dispersed in the elastomer. According to this embodiment, when the carbon fiber composite material is extruded through the narrow space between the rolls, the carbon fiber composite material is deformed to have a thickness greater than the distance between the rolls as a result of the restoring force of the elastomer due to elasticity. It is considered that the deformation causes the carbon fiber composite material to which a high shear force is applied to flow in a more complicated manner, so that the fourth carbon nanofibers are dispersed in the elastomer. The fourth carbon nanofibers that have been dispersed in the elastomer are prevented from re-aggregating due to chemical interaction with the elastomer, so that excellent dispersion stability can be obtained.

The step (d) in which the fourth carbon nanofibers are dispersed in the elastomer by applying a shear force may be performed using an internal mixing method or a multi-screw extrusion kneading method instead of the open-roll method. In other words, it suffices that a shear force sufficient to separate the aggregated fourth carbon nanofibers be applied to the elastomer. It is preferable to use the open-roll method since the actual temperature of the mixture can be measured and managed while managing the roll temperature.

In the step (d), a crosslinking agent may be mixed into the carbon fiber composite material that has been tight-milled and sheeted, and the carbon fiber composite material may thus be crosslinked to obtain a crosslinked carbon fiber composite material. Note that the carbon fiber composite material may be molded without crosslinking the carbon fiber composite material. The carbon fiber composite material may be used in the form of a sheet obtained by the open-roll method.

Alternatively, the carbon fiber composite material obtained by the step (d) may be molded into a desired shape (e.g., sheet) using a rubber molding method (e.g., injection molding, transfer molding, press molding, extrusion molding, or calendering).

In the step (d) according to this embodiment, a compounding ingredient normally used when processing an elastomer may be added. A known compounding ingredient may be used. Examples of the compounding ingredient include a crosslinking agent, a vulcanizing agent, a vulcanization accelerator, a vulcanization retarder, a softener, a plasticizer, a curing agent, a reinforcing agent, a filler, an aging preventive, a colorant, and the like. These compounding ingredients may be added to the elastomer before supplying the fourth carbon nanofibers to the open roll, for example.

In the method of producing a carbon fiber composite material according to this embodiment, the fourth carbon nanofibers are directly mixed into the elastomer having rubber elasticity. Note that the following method may also be employed. Specifically, the elastomer is masticated before mixing the fourth carbon nanofibers into the elastomer to reduce the molecular weight of the elastomer. Since the viscosity of the elastomer decreases when the molecular weight of the elastomer has decreased due to mastication, the elastomer easily enters the space between the aggregated fourth carbon nanofibers. The raw material elastomer is a rubber elastic body of which the network component in uncrosslinked form has a first spin-spin relaxation time (T2n), measured for $^1$H at 30° C. by the Hahn-echo method using the pulsed NMR technique, of 100 to 3000 μsec. The raw material elastomer is masticated to reduce the molecular weight of the elastomer to obtain a liquid elastomer having a first spin-spin relaxation time (T2n) of more than 3000 μsec. The first spin-spin relaxation time (T2n) of the liquid elastomer after mastication is preferably longer than the first spin-spin relaxation time (T2n) of the raw material elastomer before mastication by a factor of 5 to 30. The raw material elastomer is masticated until the elastomer is liquefied (i.e., until the elastomer exhibits fluidity that is not suitable for mixing) by cutting the molecules of the elastomer by applying a high shear force using the open-roll method or the like to reduce the molecular weight of the elastomer to a large extent, differing from normal mastication performed in a state in which the elastomer is solid. For example, when using the open-roll method, the elastomer is masticated at a roll temperature of 20° C. (minimum mastication time: 60 minutes) to 150° C. (minimum mastication time: 10 minutes). The roll distance d is set to 0.5 to 1.0 mm, for example. The fourth carbon nanofibers are then supplied to the liquid elastomer obtained by mastication. However, since the elasticity of the liquid elastomer has been reduced to a large extent, the aggregated fourth carbon nanofibers are dispersed to only a small extent even if the elastomer and the fourth carbon nanofibers are mixed in a state in which free radicals of the elastomer are bonded to the fourth carbon nanofibers.

Therefore, the molecular weight of the elastomer in the mixture obtained by mixing the liquid elastomer and the fourth carbon nanofibers is increased so that the elastomer recovers its elasticity to obtain a mixture that contains the rubber elastic body, and the fourth carbon nanofibers are uniformly dispersed in the elastomer by tight milling using the open-roll method or the like. The mixture that contains the elastomer having an increased molecular weight is a rubber elastic body of which the network component has a first spin-spin relaxation time (T2n), measured for $^1$H at 30° C. by the Hahn-echo method using the pulsed NMR technique, of 3000 μsec or less. The first spin-spin relaxation time (T2n) of the mixture that contains the rubber elastic body (elastomer) having an increased molecular weight is preferably higher than the first spin-spin relaxation time (T2n) of the raw material elastomer before mastication by a factor of 0.5 to 10. The elasticity of the mixture that contains the rubber elastic body may be expressed by the molecular form (observed from the molecular weight) or the molecular mobility (observed from the first spin-spin relaxation time (T2n)) of the elastomer. The molecular weight of the elastomer is preferably increased by heating the mixture in a heating furnace at 40 to 100° C. for 10 to 100 hours, for example. This causes the molecular chains of the elastomer to extend due to bonding between free radicals of the elastomer contained in the mixture and the like, so that the molecular weight of the elastomer increases. The molecular weight of the elastomer may be increased in a short time by mixing a small amount (e.g., ½ or less of a proper amount) of a crosslinking agent into the mixture, and heating (e.g., annealing) the mixture to effect a crosslinking reaction. When increasing the molecular weight of the elastomer by a crosslinking reaction, the amount of crosslinking agent, the heating time, and the heating temperature may be set so that mixing in the subsequent step is not hindered.

According to the step (d), the fourth carbon nanofibers can be more uniformly dispersed in the elastomer by reducing the viscosity of the elastomer before mixing the fourth carbon nanofibers into the elastomer. Specifically, the liquid elastomer having a reduced molecular weight easily enters the space between the aggregated fourth carbon nanofibers as compared with the case of mixing the fourth carbon nanofibers into the elastomer having a high molecular weight, so that the fourth carbon nanofibers can be more uniformly dispersed in the tight milling step. Since a large number of free radicals of the elastomer produced by breakage of the molecules of the elastomer can be strongly bonded to the surface of the fourth carbon nanofibers, the fourth carbon nanofibers can be more uniformly dispersed in the elastomer. According to the step (d), since an equal performance can be obtained using a smaller amount of fourth carbon nanofibers, expensive fourth carbon nanofibers can be saved so that the economic efficiency increases.

4. Carbon Fiber Composite Material

The carbon fiber composite material obtained by the step (d) is described below.

The carbon fiber composite material includes 100 parts by mass of an elastomer, and 20 to 100 parts by mass of carbon nanofibers that have been oxidized and reduced in number of branch points by a mechanical process, the carbon fiber composite material having a dynamic modulus of elasticity (E') at 200° C. and 10 Hz of 10 to 1000 MPa, and a volume resistivity of $10^6$ to $10^{18}$ ohms·cm. The carbon fiber composite material may include an elastomer, and fourth carbon nanofibers that are uniformly dispersed in the elastomer.

An elastomer, a plastic, or the like normally has a volume resistivity of higher than $10^{12}$ ohms·cm at room temperature. A highly insulating elastomer or the like has a volume resistivity of about $10^{18}$ ohms·cm. However, when mixing and uniformly dispersing commercially available carbon nanofibers (e.g., vapor-grown carbon fibers) in an elastomer, the elastomer has a volume resistivity of about $10^1$ ohms·cm even if the amount of vapor-grown carbon fibers is small. Specifically, when reinforcing an elastomer with carbon nanofibers, the insulating properties of the elastomer cannot be maintained (i.e., it is difficult to achieve the reinforcement effect while maintaining the insulating properties). The term "volume resistivity" used herein refers to a value measured at room temperature by the four-point probe method in accordance with JIS 7194.

The carbon fiber composite material according to this embodiment has a high volume resistivity (i.e., low electrical conduction) even when a relatively large amount of fourth carbon nanofibers are mixed and uniformly dispersed to achieve the desired strength. The carbon fiber composite material exhibits high strength and heat resistance due to reinforcement with the carbon nanofibers. Moreover, the carbon fiber composite material can be used for applications in which a rubber material is required to have electrical insulating properties. For example, a volume resistivity of $10^6$ ohms·cm or more (particularly $10^7$ ohms·cm or more) may generally be required depending on the application of the rubber material. The carbon fiber composite material can be used for such applications.

An insulating article used for oilfield applications may include the carbon fiber composite material. An electronic part may include the insulating article. A logging tool may include a housing and the electronic part disposed in the housing.

For example, analog signal communication performed by a logging tool used in an oilfield requires a volume resistivity of $10^6$ ohms·cm or more, and digital signal communication performed by a logging tool requires a volume resistivity of $10^7$ ohms·cm or more. In order to increase the transmission speed, a volume resistivity of $10^8$ ohms·cm or more (particularly $10^9$ ohms·cm or more) may be required. The carbon fiber composite material may have a volume resistivity of $10^6$ to $10^{18}$ ohms·cm, preferably $10^7$ to $10^{18}$ ohms·cm, more preferably $10^8$ to $10^{18}$ ohms·cm, and particularly preferably $10^9$ to $10^{18}$ ohms·cm. For example, a carbon fiber composite material that includes a fluoroelastomer (i.e., elastomer) and the fourth carbon nanofibers produced using the compression process in the step (b) may have a dynamic modulus of elasticity (E') at 200° C. of 15 to 300 MPa and a volume resistivity of $10^{11}$ to $10^{18}$ ohms·cm. For example, a carbon fiber composite material that includes an ethylene-propylene rubber (i.e., elastomer) and the fourth carbon nanofibers produced using the compression process in the step (b) may have a dynamic modulus of elasticity (E') at 200° C. of 10 to 200 MPa and a volume resistivity of $10^7$ to $10^{18}$ ohms·cm. A carbon fiber composite material that includes an ethylene-propylene rubber (i.e., elastomer) and the fourth carbon nanofibers produced using the grinding process in the step (b) may have a dynamic modulus of elasticity (E') at 200° C. of 10 to 200 MPa and a volume resistivity of $10^8$ to $10^{18}$ ohms·cm. The term "dynamic modulus of elasticity (E')" used herein refers to a value measured by the dynamic viscoelasticity test in accordance with JIS K 6394.

The carbon fiber composite material in uncrosslinked form may have a first spin-spin relaxation time (T2n), measured for $^1$H at 150° C. by the Hahn-echo method using the pulsed NMR technique, of 100 to 3000 μsec, and a fraction (fnn) of components having a second spin-spin relaxation time of 0 to 0.2. The first spin-spin relaxation time (T2n) and the fraction (fun) of the carbon fiber composite material measured at 150° C. indicate whether or not the fourth carbon nanofibers are uniformly dispersed in the elastomer (matrix). When the fourth carbon nanofibers are uniformly dispersed in the elastomer, the elastomer is restrained by the fourth carbon nanofibers. The mobility of the molecules of the elastomer restrained by the fourth carbon nanofibers is small as compared with the case where the molecules of the elastomer are not restrained by the fourth carbon nanofibers. Therefore, the first spin-spin relaxation time (T2n), the second spin-spin relaxation time (T2nn), and the spin-lattice relaxation time (T1) of the carbon fiber composite material are shorter than those of the elastomer that does not include the fourth carbon nanofibers, and further decrease when the fourth carbon nanofibers are uniformly dispersed in the elastomer.

When the molecules of the elastomer are restrained by the fourth carbon nanofibers, the number of non-network components (non-reticulate chain components) is considered to decrease for the following reasons. Specifically, when the molecular mobility of the entire elastomer has decreased due to the fourth carbon nanofibers, the number of non-network components that cannot easily move increases so that the non-network components tend to behave in the same manner as the network components. Moreover, since the non-network components (terminal chains) easily move, the non-network components tend to be adsorbed on the active sites of the fourth carbon nanofibers. It is considered that these phenomena decrease the number of non-network components. Therefore, the fraction (fn) of components having the second spin-spin relaxation time (T2nn) becomes greater than that of the elastomer that does not include the fourth carbon nanofibers (i.e., fn+fnn=1). Accordingly, when the carbon fiber composite material has values measured by the Hahn-echo method using the pulsed NMR technique within the above ranges, the fourth carbon nanofibers are uniformly dispersed in the carbon fiber composite material.

An interfacial phase is formed around the fourth carbon nanofibers. The interfacial phase is considered to be an aggregate of the molecules of the elastomer formed when the molecular chains of the elastomer are cut during mixing, and free radicals thus produced attack and adhere to the surface of the fourth carbon nanofibers. The interfacial phase is considered to be similar to a bound rubber that is formed around carbon black when mixing an elastomer and carbon black, for example. The interfacial phase covers and protects the fourth carbon nanofibers. When adding the carbon nanofibers in an amount equal to or larger than a given amount, nanometer-sized cells of the elastomer that are enclosed by the linked interfacial phases are considered to be formed. These small cells are almost homogeneously formed over the entire carbon fiber composite material so that an effect that exceeds an effect achieved by merely combining two materials is expected to be achieved.

5. Logging Tool

Figure 7:
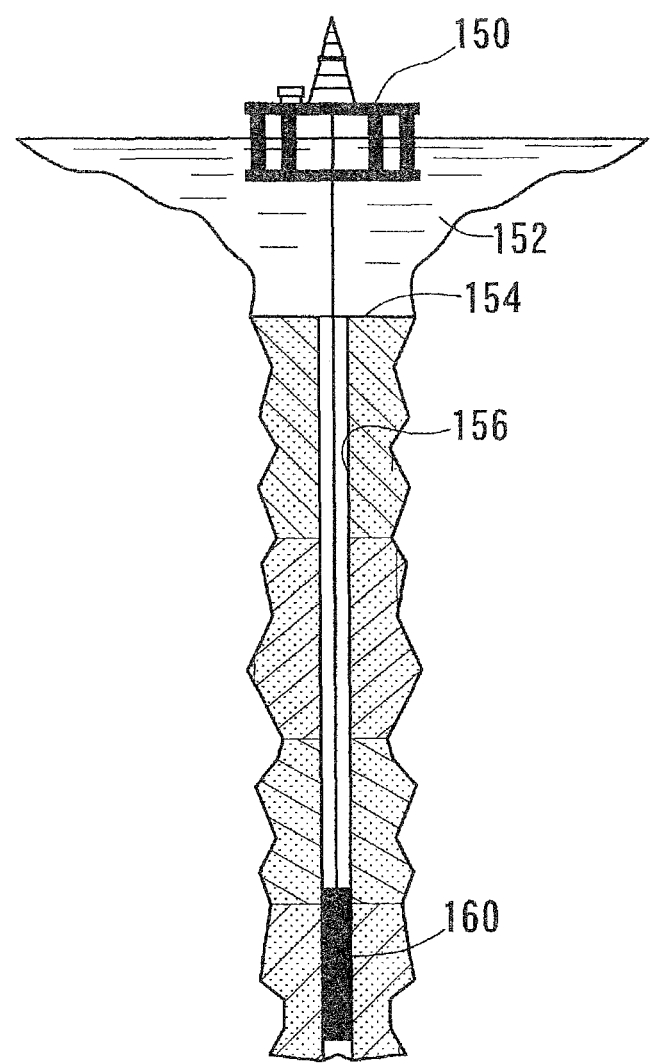
FIG. 7 is a cross-sectional view schematically illustrating a logging tool according to one embodiment of the invention that is used for subsea applications.
Figure 8:
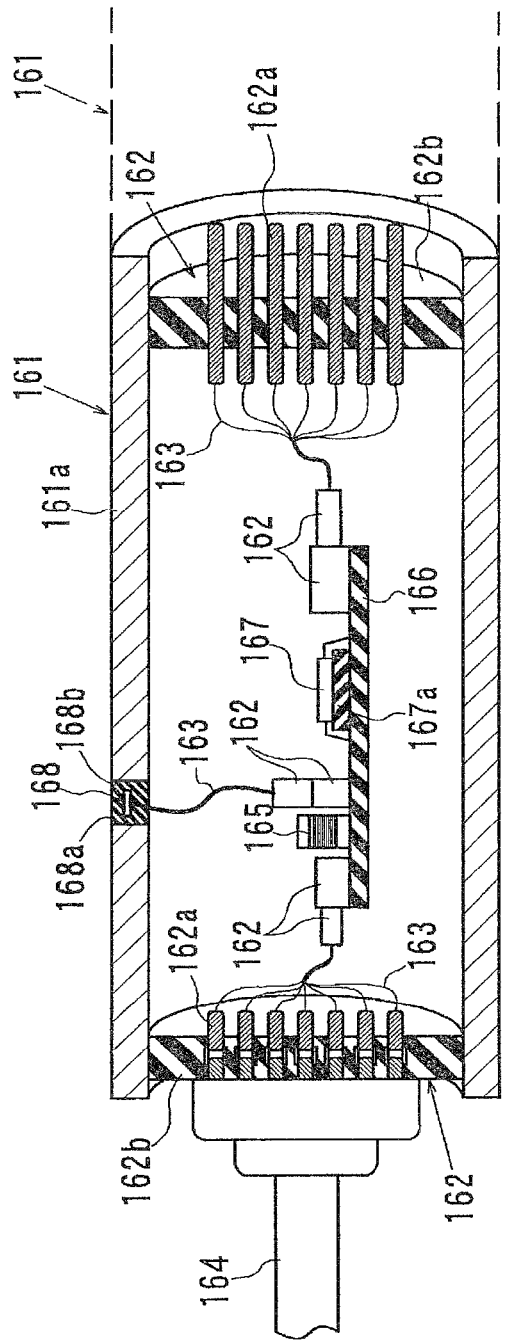
FIG. 8 is a cross-sectional view schematically illustrating a housing of the logging tool according to one embodiment of the invention shown in FIG. 7.
Figure 9:
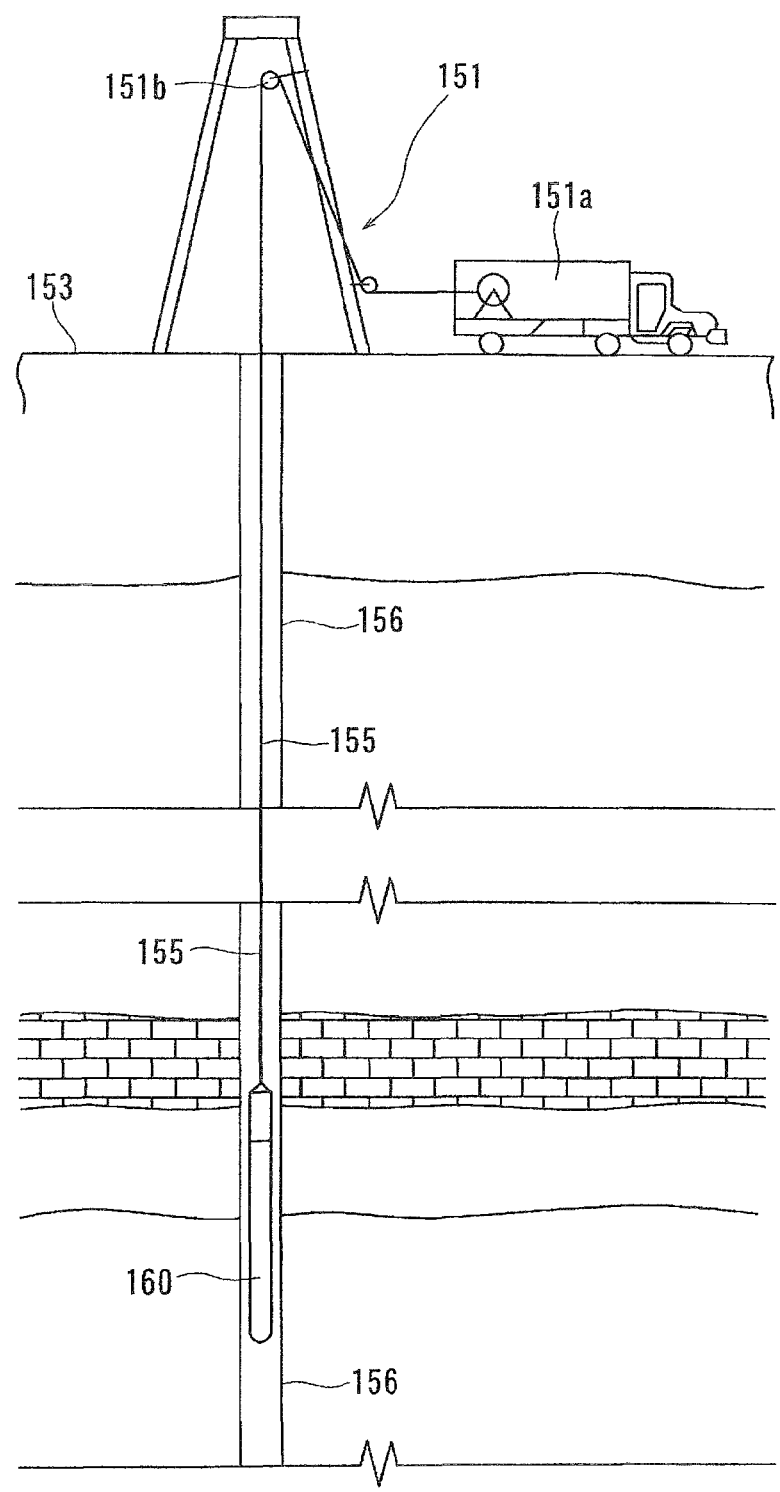
FIG. 9 is a cross-sectional view schematically illustrating a logging tool according to one embodiment of the invention that is used for underground applications.

FIG. 7 is a cross-sectional view schematically illustrating a logging tool according to one embodiment of the invention that is used for subsea applications. FIG. 8 is a cross-sectional view schematically illustrating a housing of the logging tool according to one embodiment of the invention shown in FIG. 7. FIG. 9 is a cross-sectional view schematically illustrating a logging tool according to one embodiment of the invention that is used for underground applications.

The logging tool records physical properties of a formation, a reservoir, and the like inside and around a borehole, geometrical properties (e.g., pore size, orientation, and slope) of a borehole or a casing, the flow behavior of a reservoir, and the like at each depth. For example, the logging tool may be used in an oilfield. For example, the logging tool may be used for subsea applications shown in FIGS. 7 and 8, or underground applications shown in FIG. 9. The logging tool may be used for wireline log/logging, mud logging, logging-while-drilling (LWD), measurement-while-drilling (MWD) (i.e., a measuring instrument is provided in a drilling assembly), and the like. The following description is given taking an example of a logging tool used for wireline log/logging.

As illustrated in FIG. 7, when probing subsea resources using a wireline log/logging tool, a downhole apparatus 160

(i.e., logging tool) is caused to advance in a borehole 156 (vertical or horizontal passageway) formed in an ocean floor 154 from a platform 150 on the sea 152, and the underground structure and the like are probed to determine the presence or absence of the target substance (e.g., petroleum), for example. The downhole apparatus 160 is secured on the end of a long cable or communication link that extends from the platform, for example. The downhole apparatus 160 includes a housing 161 (e.g., pressure vessel) shown in FIG. 8. Electronic instruments for electrical logging (e.g., SP logging, normal logging, induction logging, latero logging, and micro-resistivity logging), radioactivity logging (e.g., gamma-ray logging, neutron logging, formation density logging, and nuclear magnetic resonance logging), sonic logging (e.g., sonic logging, array-sonic logging, and cement bond logging, etc.) geological information logging (e.g., dip meter and FM1), seismic logging (e.g., check shot velocity logging and VSP), sampling logging (e.g., sidewall-coring logging, RFT, and MDT), auxiliary logging (e.g., caliper measurement, borehole geometry logging, and temperature logging), special logging (logs in hostile environment), measurement through a drill pipe, and the like are selectively provided in the housing 161 depending on the objective of probing so that the underground structure and the like can be probed. Since the downhole apparatus 160 is subjected to a high temperature inside the borehole 156 formed deep underground, and also subjected to vibrations and impact when the downhole apparatus 160 is caused to advance in the borehole 156, high heat resistance and high strength are required for the electronic instruments provided in the housing 161.

A plurality of electrical connectors 162 are disposed in the housing 161, or a plurality of housings 161 are connected via electrical connectors 162 formed at the ends. The electrical connector 162 includes a plurality of spaced pins 162a, and a support section 162b that secures the pins 162a. The support section 162b may be formed using the carbon fiber composite material. For example, the electrical connectors 162 disposed on the ends of the housing 161 shown in FIG. 8 are configured so that the pins 162a can be secured by the support section 162b formed of the carbon fiber composite material while insulating the pins 162a. The pins 162a of the electrical connector 162 are subjected to vibrations and impact applied to the downhole apparatus 160. When the pins 162a are connected to electric wires 163, the electric wires 163 move due to vibrations. Therefore, the support section 162b is required to reliably secure the pins 162a. The downhole apparatus 160 can be used in a severe high-temperature environment inside the borehole 156 for a relatively long time by securing the pins 162a using the carbon fiber composite material. Moreover, the carbon fiber composite material has a volume resistivity equal to or higher than $10^6$ ohms·cm that is normally required for insulation between the pins although the carbon fiber composite material is reinforced with the carbon nanofibers. The support section 162b of the electrical connector 162 also functions as a feedthrough of the housing 161. For example, such a feedthrough is disclosed in U.S. Pat. No. 7,226,312, the entire disclosure of which is incorporated by reference herein.

A plurality of electric wires 163 are disposed in the housing 161, and connected to the pins 162a of the electrical connector 162, for example. The electric wire 163 includes a conductive wire (core) formed of a conductive metal, and a covering section that covers the conductive wire. The covering section may be formed of the carbon fiber composite material. The electric wire 163 covered with the carbon fiber composite material can withstand vibrations and impact applied to the downhole apparatus 160 in a severe high-temperature environment while exhibiting insulating properties. For example, such an electric wire is disclosed in U.S. Pat. No. 6,446,723, the entire disclosure of which is incorporated by reference herein.

A cable 164 (i.e., a bundle of a plurality of cores (e.g., electric wires)) is connected to the housing 161, and extends from the housing 161. The cable 164 includes a core, and a covering section that covers the core. The covering section may be formed of the carbon fiber composite material. The core of the cable 164 may include a plurality of cores (e.g., electric wires). When the cable 164 is used for wireline log/logging, the cable 164 is used to transfer data and a command between the housing 161 and a data acquisition system on the ground, or supply electric power to the electronic instruments provided in the housing 161. The cable 164 can withstand wear and fracture due to contact with the inner surface of the rod that extends through the borehole 156 while exhibiting insulating properties. For example, such a cable is disclosed in U.S. Pat. No. 7,259,331, the entire disclosure of which is incorporated by reference herein.

A plurality of coils 165 are disposed in the housing 161, for example. A magnet wire is wound around the coil 165. The magnet wire may be referred to as a coil wire. The magnet wire includes a conductive wire, and a covering section that covers the conductive wire. The covering section may be formed of the carbon fiber composite material. The covering section is formed as a thin insulating film using the carbon fiber composite material. The covering section can withstand vibrations and impact applied to the downhole apparatus 160 in a severe high-temperature environment while exhibiting insulating properties. Heat can be effectively dissipated from the magnet wire due to the heat transfer effect of the fourth carbon nanofibers while maintaining insulating properties by covering the magnet wire with the carbon fiber composite material. For example, such a magnet wire is disclosed in U.S. Pat. No. 6,898,997, the entire disclosure of which is incorporated by reference herein.

An electric board 166 on which a plurality of electronic parts 167 are mounted is disposed inside the housing 161, for example.

A heat sink sheet 167a may be disposed inside the housing 161 in order to prevent overheating of the electronic parts 167 due to self-heating, for example. The heat sink sheet 167a is also referred to as a heat sink. In FIG. 8, the heat sink sheet 167a is disposed between the electronic part 167 and the electric board 166 so as to come in contact with the surface of the electronic part 167. Note that the heat sink sheet 167a may be disposed to come in contact with the surface of the electronic part 167 on the side opposite to the electric board 166. Heat can be effectively dissipated from the electronic part 167 due to the heat transfer effect of the fourth carbon nanofibers while maintaining insulating the electronic part 167 by forming the heat sink sheet 167a using the carbon fiber composite material. Moreover, the heat sink sheet 167a can be used as a vibration-resistant sheet so that the impact resistance of the electronic part 167 can be improved. For example, such a heat sink sheet is disclosed in US-A-2008/0223579, the entire disclosure of which is incorporated by reference herein. For example, such a vibration-resistant sheet is disclosed in U.S. Pat. No. 6,280,874, US-A-2009/0183941, and US-A-2009/0151589, the entire disclosure of which is incorporated by reference herein.

The electronic part 167 disposed inside the housing 161 or an electronic part (sensor 168) embedded in a wall 161a of the housing 161 may be entirely covered with the carbon fiber composite material. The electronic part 167 can be provided with water resistance using the carbon fiber composite material. For example, the sensor 168 is disposed in an opening 168a formed in the wall 161a of the housing 161 together with the electric wire 163 (including a lead wire (not shown) connected to the sensor 168, and the opening 168a is filled (molded) with a carbon fiber composite material 168b. The electronic part 167 may be embedded in the carbon fiber composite material so that the entire electronic part 167 on the electric board 166 is covered with the carbon fiber composite material. The sensor 168 or the electronic part 167 covered with the carbon fiber composite material 168b has resistance against water outside or inside the housing 161 while exhibiting insulating properties.

The amount of the fourth carbon nanofibers may be appropriately changed, or additives (e.g., carbon black) may be appropriately added depending on the strength, insulating properties, and the like required for each part that utilizes the carbon fiber composite material. The logging tool has been described above with reference to FIGS. 7 and 8 taking an example in which the housing 161, the electrical connector 162, the cable 164, the coil 165, the electric board 166, the heat sink sheet 167a, and the waterproof structure are incorporated in a single logging tool (see FIG. 8). Note that the configuration of the logging tool is not limited thereto. The elements may be selectively incorporated in the logging tool depending on the logging application.

As illustrated in FIG. 9, when probing underground resources from a ground 153 utilizing wireline log/logging, a ground apparatus 151 that includes a logging truck 151a, a winch 151b, and the like, and a downhole apparatus 160 that is secured on the end of a wireline 155 that extends through a borehole 156 from the winch 151b, may be used. The downhole apparatus 160 is basically the same as the above-described logging tool for subsea applications. Therefore, description thereof is omitted.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

6. Examples

The invention is further described below by way of examples. Note that the invention is not limited to the following examples.

6.1 Production of Carbon Nanofibers 6.1.1 First Carbon Nanofibers

A spray nozzle was installed at the top of a vertical heating furnace (inner diameter: 17.0 cm, length: 150 cm). The inner wall temperature (reaction temperature) of the heating furnace was increased to and maintained at 1000° C. A liquid raw material (i.e., benzene containing 4 wt % of ferrocene) (20 g/min) was supplied from the spray nozzle together with hydrogen gas (100 l/min) so that the raw material was directly sprayed onto the wall of the furnace. The spray nozzle had a conical shape (trumpet shape or umbrella shape). The vertex angle of the nozzle was 60°. Ferrocene was pyrolyzed under the above conditions to produce iron particles. The iron particles served as seeds so that first carbon nanofibers were produced and grown from carbon produced by pyrolysis of benzene. The first carbon nanofibers were continuously produced by the above method over one hour while scraping off the first carbon nanofibers at intervals of 5 minutes.

6.1.2 Carbon Nanofibers for Comparative Examples

Graphitized carbon nanofibers ("S" in the tables), ground carbon nanofibers ("SH" in the tables), and oxidized carbon nanofibers ("SO" in the tables) were produced as carbon nanofibers for producing the samples of the comparative examples.

The graphitized carbon nanofibers (S) were produced by heating and graphitizing the first carbon nanofibers obtained in section "6.1.1" at 2800° C. in an inert gas atmosphere. The graphitized carbon nanofibers (S) had an average diameter of 87 nm, an average length of 9.1 μm, and a surface oxygen concentration of 2.1 atm %. The graphitized carbon nanofibers (S) correspond to commercially available carbon nanofibers ("VGCF-S" manufactured by Showa Denim K.K.).

The ground carbon nanofibers (SH) were produced by grinding the graphitized carbon nanofibers (S) for 0.5 minutes using a rotary grinder "Wonder Blender WB-1" (manufactured by Osaka Chemical Co., Ltd., stainless steel blade, peripheral velocity: 180 m/s).

The oxidized carbon nanofibers (SO) were produced by placing 120 g of the graphitized carbon nanofibers (S) in a container (300×300×150 mm), placing the container in a heating furnace (700×350×900 mm) into which air was continuously introduced at 50 ml/min, and heating and oxidizing the graphitized carbon nanofibers in the heating furnace. The heating temperature and the heating time are shown in Table 1 (step (c)). The actual temperature inside the heating furnace was ±30° C. with respect to the set temperature.

6.1.3 Fourth Carbon Nanofibers

When using the compression process in the step (b), the fourth carbon nanofibers ("SAPO" in the tables) were produced as follows. Specifically, the first carbon nanofibers obtained in section "6.1.1" were heated in an inert gas atmosphere at the heating temperature (1200° C.) shown in Table 1 (step (c)) that is lower than the reaction temperature employed in the vapor growth method to obtain second carbon nanofibers (SA). The second carbon nanofibers (SA) were supplied to a dry compression granulator having two rolls, and rolled (step (b) in Table 1) to obtain third carbon nanofibers (SAP). The third carbon nanofibers (SAP) were placed in a heating furnace containing air, and heated and oxidized at the heating temperature (650° C.) for the heating time (two hours) shown in Table 1 (step (c)) to obtain the fourth carbon nanofibers. In the step (b) (rolling) when producing the fourth carbon nanofibers, the second carbon nanofibers (SA) were supplied to and rolled in a dry compression granulator having two rolls. A roll press machine (roll diameter: 150 mm, roll: flat roll, roll distance: 0 mm, roll compressive force (linear pressure): 1960 N/cm, gear ratio: 1:1.3, roll rotational speed: 3 rpm) was used as the dry compression granulator. The carbon nanofibers were granulated into plate-shaped aggregates (aggregates of carbon nanofibers) having a diameter of about 2 to 3 cm. The granulated plate-shaped aggregates were crushed using a crush granulator (rotational speed: 15 rpm, screen: 5 mm) having eight rotary knives to adjust the particle size of the aggregates. The step (c) (oxidation treatment) when producing the fourth carbon nanofibers was performed under the same conditions as the production conditions for the oxidized carbon nanofibers (SO).

When using the grinding process in the step (b), the fourth carbon nanofibers ("SAHO" in the tables) were produced as follows. Specifically, the first carbon nanofibers obtained in section "6.1.1" were heated in an inert gas atmosphere at the heating temperature (1200° C.) shown in Table 1 (step (a)) that is lower than the reaction temperature employed in the vapor growth method to obtain second carbon nanofibers (SA). The second carbon nanofibers (SA) were supplied to a rotary grinder "Wonder Blender WB-1" (manufactured by Osaka Chemical Co., Ltd., stainless steel blade, peripheral velocity: 180 m/s), and ground (step (b) in Table 1) for 0.5 minutes to obtain third carbon nanofibers (SAH). The third carbon nanofibers (SAH) were placed in a heating furnace containing air, and heated and oxidized at the heating temperature (650° C.) for the heating time (two hours) shown in Table 1 (step (c)) to obtain the fourth carbon nanofibers. The step (b) (grinding process) when producing the fourth carbon nanofibers was performed under the same conditions as the production conditions for the ground carbon nanofibers (SH). The step (c) (oxidation treatment) when producing the fourth carbon nanofibers was performed under the same conditions as the production conditions for the oxidized carbon nanofibers (SO).

6.1.4 Measurement of Carbon Nanofibers

The bulk density, fiber length, defect ratio, mass residual ratio, Raman peak ratio, tap density, specific surface area by nitrogen adsorption, oxygen concentration, oxygen concentration increase amount, and oxygen concentration increase rate of the carbon nanofibers (S, SH, SO, SAPO, SAHO) were measured. The results are shown in Table 1. In Table 1, "–" indicates that the measurement was not performed.

The bulk density (zero tap density) was measured in accordance with JIS K 6219-2.

The fiber length and the defect ratio were determined by photographing the carbon nanofibers (40 areas) using a scanning electron microscope (SEM) (magnification: 5000), and measuring the fiber length and the number of fibers having a defect (200 fibers in total). The number of fibers having a branch point and the number of fibers having a bend point were counted. The ratio (%) of the number of fibers having a defect (branch point or bend point) to the total number (200) of fibers was calculated. The ratio of the carbon nanofibers having a fiber length of 20 μm or more ("ratio of fibers having fiber length of 20 μm or more" in Table 1) was also calculated.

The ratio of the mass of the fourth carbon nanofibers (SAPO) to the mass (100 mass %) of the third carbon nanofibers (SAP) was calculated to be the mass residual ratio of the fourth carbon nanofibers (SAPO). The ratio of the mass of the fourth carbon nanofibers (SAHO) to the mass (100 mass %) of the third carbon nanofibers (SAH) was calculated to be the mass residual ratio of the fourth carbon nanofibers (SAHO). The ratio of the mass of the oxidized carbon nanofibers (SO) to the mass (100 mass %) of the graphitized carbon nanofibers (S) was calculated to be the mass residual ratio of the oxidized carbon nanofibers (SO).

The ratio (D/G) of the peak intensity D at around 1300 cm$^{-1}$ to the peak intensity G at around 1600 cm$^{-1}$ of the carbon nanofibers was measured by Raman scattering spectroscopy using a measuring instrument "HOLOLAB-5000" (manufactured by KAISER OPTICAL SYSTEM, 532 nm ND:YAG).

The specific surface area by nitrogen adsorption (m$^2$/g) of the carbon nanofibers was measured using a measuring instrument "NOVA 3000" (nitrogen gas) (manufactured by Yuasa-Ionics Co., Ltd.). The third carbon nanofibers (SAH) had a specific surface area by nitrogen adsorption of 38 m$^2$/g (not shown in Table 1).

The oxygen concentration of the third carbon nanofibers (SAP or SAH), the graphitized carbon nanofibers (S), the oxidized carbon nanofibers (SO), and the fourth carbon nanofibers (SAPO or SAHO) was measured by X-ray photoelectron spectroscopy (XPS). For example, when measuring the oxygen concentration of the fourth carbon nanofibers, the fourth carbon nanofibers were sprinkled over and caused to adhere to a carbon tape on a metal stage. After removing the fourth carbon nanofibers that did not adhere to the carbon tape, the metal stage was installed in an XPS apparatus. A microanalysis X-ray photoelectron spectroscopy apparatus "PS-9200" (XPS apparatus) manufactured by JEOL Ltd. was used to measure the oxygen concentration. The fourth carbon nanofibers (powder sample) were subjected to argon gas etching (argon gas concentration: 8×10$^{-2}$ Pa) for 0.5 minutes to expose the surface of the fourth carbon nanofibers. The surface oxygen concentration of the fourth carbon nanofibers was then measured (analysis diameter of X-ray source: 1 mm, anticathode: Al/Mg twin target, accelerating voltage: 10 kV, emission current: 30 mA). Oxygen and carbon were detected on the surface of the fourth carbon nanofibers by XPS. The above measurement was also performed on other carbon nanofibers.

An increase amount ($c_p = b_p - a_p$) and an increase rate ($d_p = 100 \cdot c_p / a_p$) of the surface oxygen concentration ($b_p$) of the fourth carbon nanofibers (SAPO) with respect to the surface oxygen concentration ($a_p$) of the unoxidized third carbon nanofibers (SAP) were calculated based on the surface oxygen concentration measurement results for the carbon nanofibers. The results are shown in Table 1. An increase amount ($c_h = b_h - a_h$) and an increase rate ($d_h = 100 \cdot c_h / a_h$) of the surface oxygen concentration ($b_h$) of the fourth carbon nanofibers (SAHO) with respect to the surface oxygen concentration ($a_h$) of the unoxidized third carbon nanofibers (SAH) were also calculated. The results are shown in Table 1. An increase amount ($c_s = b_s \cdot a_s$) and an increase rate ($d_s = 100 \cdot c_s / a_s$) of the surface oxygen concentration ($b_s$) of the oxidized carbon nanofibers (SO) with respect to the surface oxygen concentration ($a_s$) of the unoxidized graphitized carbon nanofibers (S) were also calculated. The results are shown in Table 1.

TABLE 1

| | Carbon nanofibers | | | S | SH | SO | SAPO | SAHO |
|---|---|---|---|---|---|---|---|---|
| Carbon nanofiber production process | Step (a) | Heating temperature | ° C. | 2800 | 2800 | 2800 | 1200 | 1200 |
| | Step (b) | Compression/grinding | | None | Grinding | None | Compression | Grinding |
| | Step (c) | Heating temperature | ° C. | — | — | 650 | 650 | 650 |
| | | Heating time | hour | — | — | 2 | 2 | 2 |
| Properties of carbon nanofibers | CNT bulk density | | g/cm$^3$ | 0.02 | 0.2 | 0.018 | 0.15 | 0.18 |
| | Fiber length | Average fiber length | μm | 9.1 | 8.0 | 9.4 | 4.8 | 7.5 |
| | | Maximum fiber length | μm | 20.8 | 17.1 | 17.8 | 11.5 | 15.5 |
| | | Minimum fiber length | μm | 4.6 | 2.9 | 5.1 | 1.6 | 2.8 |
| | Ratio of fibers having fiber length of 20 μm or more | | % | 0.5 | 0.0 | 0.0 | 0 | 0 |

TABLE 1-continued

| Carbon nanofibers | | | S | SH | SO | SAPO | SAHO |
|---|---|---|---|---|---|---|---|
| Defect rate | Branch point | % | 8.0 | 0.0 | 4.5 | 0 | 0 |
| | Bend point | % | 11.0 | 7.5 | 10.5 | 5.0 | 5.0 |
| | Total | % | 19.0 | 7.5 | 15.0 | 5.0 | 5.0 |
| Mass residual ratio | | mass % | 100 | 100 | 88.9 | 85 | 87 |
| Raman peak ratio | | (D/G) | 0.11 | 1.20 | 0.19 | 1.1 | 1.2 |
| Specific surface area by nitrogen adsorption | | $m^2/g$ | 25 | 22 | 43 | 50 | 50 |
| Oxygen concentration | | atm % | 2.1 | — | 3.5 | 4.5 | 3.6 |
| Oxygen concentration increase amount | | atm % | — | — | 1.4 | 2.3 | 1.5 |
| Oxygen concentration increase rate | | % | — | — | 67 | 110 | 71% |

6.2 Production of Carbon Fiber Composite Material Samples of Examples 1 to 8 and Comparative Examples 1 to 9

6.2.1 FKM

Samples of Examples 1 and 2 and Comparative Examples 1 to 5 were produced as follows. 100 parts by mass (phr) of a fluoroelastomer (FKM) shown in Tables 2 and 3 was supplied to an open roll (roll diameter: six inches, roll temperature: 10 to 20° C.), and wound around the roll. The carbon nanofibers obtained in section "6.1" in an amount (parts by mass (phr)) shown in Tables 2 and 3 were added to the elastomer together with an additive (e.g., triallyl isocyanate or peroxide). The roll distance was set to 1.5 mm. After the addition of the additive, the mixture was removed from the roll. After reducing the roll distance to 0.3 mm from 1.5 mm, the mixture was re-supplied to the roll, and tight-milled. The surface velocity ratio of the rolls was set to 1.1. The tight-milling operation was repeated 10 times. After setting the roll distance to 1.1 mm, the tight-milled composite material was re-supplied to the roll, and sheeted to obtain an uncrosslinked carbon fiber composite material. After rolling the carbon fiber composite material, the carbon fiber composite material was pressed (cured) at 170° C. for 10 minutes. The cured carbon fiber composite material was post-cured at 200° C. for 24 hours to obtain crosslinked carbon fiber composite materials (sheet-shaped, thickness: 1 mm) of Examples 1 and 2 and Comparative Examples 1 to 5. In Tables 2 and 4, "FKM" indicates a ternary fluoroelastomer ("Viton GF-600S" manufactured by DuPont Dow Elastomers Japan, weight average molecular weight: 50,000, T2n/30° C.: 50 μsec).

6.2.2 EPDM

Samples of Examples 3 to 8 and Comparative Examples 6 to 9 were produced as follows. An ethylene-propylene rubber (EPDM) in an amount shown in Tables 2, 3, and 5 was supplied to an open roll (roll temperature: 20° C.), and masticated. After the addition of the carbon nanofibers obtained in section "6.1.", the components were mixed, subjected to a first mixing step, and removed from the roll. The mixture was again supplied to the open roll (roll temperature: 100° C.), subjected to a second mixing step, and removed from the roll. The mixture was wound around the open roll (roll temperature: 10 to 20° C., roll distance: 0.3 mm), and tight-milled 5 times. The surface velocity ratio of the rolls was set to 1.1. After setting the roll distance to 1.1 mm, the carbon fiber composite material obtained by tight milling was re-supplied to the open roll, and sheeted. The resulting sheet was compression-molded at 90° C. for 5 minutes to obtain uncrosslinked carbon fiber composite material samples (thickness: 1 mm) of Examples 3 to 8 and Comparative Examples 6 to 9. Separately, 2 parts by mass (phr) of a peroxide was mixed into the uncrosslinked carbon fiber composite material obtained by tight milling. The mixture was supplied to the open roll (roll distance: 1.1 mm), and sheeted. The carbon fiber composite material that was sheeted and cut into a die size was placed in a die, and compression-molded at 175° C. and 100 kgf/cm² for 20 minutes to obtain crosslinked carbon fiber composite material samples (thickness: 1 mm) of Examples 3 to 5 and Comparative Examples 6 to 8. In Tables 2, 3, and 5, "EPDM" indicates an ethylene-propylene rubber "EP103AF" (manufactured by JSR Corporation). In Comparative Examples 1 and 6, the mixing process was performed in the same manner as described above, except that the carbon nanofibers were not used.

6.3 Measurement Using Pulsed NMR Technique

The uncrosslinked carbon fiber composite material samples of Examples 1 to 8 and Comparative Examples 1 to 9 were subjected to measurement by the Hahn-echo method using the pulsed NMR technique. A measuring instrument "JMN-MU25" (manufactured by JEOL, Ltd.) was used for the measurement. The measurement was conducted under conditions of an observing nucleus of $^1H$, a resonance frequency of 25 MHz, and a 90-degree pulse width of 2 μsec. A decay curve was determined while changing Pi in the pulse sequence (90° x-Pi-180° x) of the Hahn-echo method. The measurement was conducted in a state in which the sample was inserted into a sample tube within an appropriate magnetic field range. The measurement temperature was 150° C. The first spin-spin relaxation time (T2n/150° C.) and the fraction (fnn) of components having the second spin-spin relaxation time of each sample were determined by this measurement. The measurement results are shown in Tables 2 to 4. The first spin-spin relaxation times (T2n/30° C.) of the raw material rubber measured in the same manner as described above is also shown in Tables 2 to 5. Note that the measurement results could not be obtained for the carbon fiber composite material samples of Examples 1 to 5, 7, and 8 since the magnetic field was affected by the carbon nanofibers.

6.4 Measurement of Hardness (Hs), 100% Modulus (M100), Tensile Strength (TB), Elongation at Break (EB), Dynamic Modulus of Elasticity (F), and Volume Resistivity The rubber hardness (Hs (JIS-A)) of the crosslinked carbon fiber composite material samples of Examples 1 to 8 and Comparative Examples 1 to 9 was measured in accordance with JIS K 6253.

Specimens prepared by cutting the crosslinked carbon fiber composite material samples of Examples 1 to 8 and Comparative Examples 1 to 9 in the shape of a JIS No. 6 dumbbell were subjected to a tensile test in accordance with JIS K 6251 at a temperature of 23±2° C. and a tensile rate of 500 mm/min using a tensile tester (manufactured by Toyo Seiki Seisakusho, Ltd.) to measure the tensile strength (TB (MPa)), elongation at break (EB (%)), and 100% modulus (M100).

Specimens were prepared by cutting the crosslinked carbon fiber composite material samples of Examples 1 to 8 and Comparative Examples 1 to 9 in the shape of a strip (40×1×5 (width) mm). Each specimen was subjected to a dynamic viscoelasticity test using a dynamic viscoelasticity tester DMS6100 (manufactured by SIT) at a chuck distance of 20 mm, a measurement temperature of −100 to 300° C., a dynamic strain of ±0.05%, and a frequency of 10 Hz in accordance with JIS K 6394 to measure the dynamic modulus of elasticity (E', MPa) at 30° C. and 200° C.

The volume resistivity (ohms·cm) at 23° C. of the crosslinked carbon fiber composite material samples (width: 50 mm, length: 50 mm, thickness: 1 mm) of Examples 1 to 8 and Comparative Examples 1 to 9 was measured in accordance with JIS K 6271. The electrical insulating properties of the carbon fiber composite material sample were evaluated based on the measurement results. A case where the volume resistivity was $1 \times 10^6$ or more (excellent insulating properties) was evaluated as "Good", and a case where the volume resistivity was less than $1 \times 10^6$ (poor insulating properties) was evaluated as "Bad".

TABLE 2

| | | | | Example 1 | Example 2 | Example 3 | Example 4 | Example 5 |
|---|---|---|---|---|---|---|---|---|
| Estramer | | Type | | FKM | FKM | EPDM | EPDM | EPDM |
| Carbon nanofibers | | Type | | | | SAPO | | |
| Carbon fiber composite material | Composition | Estramer | Phr | 100 | 100 | 100 | 100 | 100 |
| | | Carbon nanofibers | Phr | 20 | 36 | 20 | 60 | 100 |
| Pulsed NMR measurement results for uncrosslinked form | Raw material | T2n (30° C.) | μsec | 51 | 51 | 520 | 520 | 520 |
| | Carbon fiber composite material | T2n (150° C.) | μsec | — | — | — | — | — |
| | | fnn (150° C.) | | — | — | — | — | — |
| | | T2s (150° C.) | μsec | — | — | — | — | — |
| Properties of crosslinked carbon fiber composite material | | Hardness JIS A | | 70 | 85 | 65 | 77 | 83 |
| | | 100% modulus (M100) | MPa | 12.5 | 27.1 | 5.6 | 17.9 | 23.5 |
| | | Tensile strength (TB) | MPa | 19.2 | 29.6 | 10.5 | 22.5 | 29.3 |
| | | Elongation at break (EB) | % | 250 | 130 | 230 | 190 | 140 |
| | | Dynamic modulus of elasticity (E' (30° C.)) | MPa | 26 | 210 | 14 | 72 | 143 |
| | | Dynamic modulus of elasticity (E' (200° C.)) | MPa | 18 | 88 | 12 | 48 | 56 |
| | | Volume resistivity | ohms·cm | >$10^{14}$ | $9.2 \times 10^{11}$ | $2.8 \times 10^8$ | $1.1 \times 10^8$ | $1.5 \times 10^7$ |
| | | Evaluation of electrical insulating properties | | Good | Good | Good | Good | Good |

TABLE 3

| | | | | Example 6 | Example 7 | Example 8 |
|---|---|---|---|---|---|---|
| Estramer | | Type | | EPDM | EPDM | EPDM |
| Carbon nanofibers | | Type | | SAHO | | |
| Carbon fiber composite material | Composition | Estramer | phr | 100 | 100 | 100 |
| | | Carbon nanofibers | phr | 20 | 60 | 100 |
| Pulsed NMR measurement results for uncrosslinked form | Raw material | T2n (30° C.) | μsec | 520 | 520 | 520 |
| | Carbon fiber composite material | T2n (150° C.) | μsec | 800 | — | — |
| | | fnn (150° C.) | | 0.03 | — | — |
| | | T2s (150° C.) | μsec | 40 | — | — |
| Properties of crosslinked carbon fiber composite material | | Hardness JIS A | | 66 | 82 | 86 |
| | | 100% modulus (M100) | MPa | 6.5 | 20.2 | 27.2 |
| | | Tensile strength (TB) | MPa | 11.3 | 24.6 | 31.1 |
| | | Elongation at break (EB) | % | 250 | 200 | 150 |
| | | Dynamic modulus of elasticity (E' (30° C.)) | MPa | 15 | 68 | 145 |
| | | Dynamic modulus of elasticity (E' (200° C.)) | MPa | 11 | 50 | 61 |
| | | Volume resistivity | ohms·cm | $2.8 \times 10^{11}$ | $3.3 \times 10^9$ | $8.9 \times 10^8$ |
| | | Evaluation of electrical insulating properties | | Good | Good | Good |

TABLE 4

| | | | | Comparative Example 1 | Comparative Example 2 | Comparative Example 3 | Comparative Example 4 | Comparative Example 5 |
|---|---|---|---|---|---|---|---|---|
| Estramer | | Type | | FKM | FKM | FKM | FKM | FKM |
| Carbon nanofibers | | Type | | — | S | S | SO | SO |
| Carbon fiber composite material | Composition | Estramer | Phr | 100 | 100 | 100 | 100 | 100 |
| | | Carbon nanofibers | phr | 0 | 5 | 12.5 | 5 | 12.5 |

TABLE 4-continued

|  |  |  |  | Comparative Example 1 | Comparative Example 2 | Comparative Example 3 | Comparative Example 4 | Comparative Example 5 |
|---|---|---|---|---|---|---|---|---|
| Pulsed NMR measurement results for uncrosslinked form | Raw material | T2n (30° C.) | μsec | 51 | 51 | 51 | 51 | 51 |
| | Carbon fiber composite material | T2n (150° C.) | μsec | 1040 | 1920 | 1040 | 1800 | 920 |
| | | fnn (150° C.) | | 0.21 | 0.38 | 0.17 | 0.31 | 0.16 |
| | | T2s (150° C.) | μsec | 920 | 563 | 461 | 520 | 480 |
| Properties of crosslinked carbon fiber composite material | Hardness JIS A | | | 57 | 75 | 84 | 75 | 86 |
| | 100% modulus (M100) | | MPa | 1.2 | 3.7 | 5.8 | 6.2 | 12.4 |
| | Tensile strength (TB) | | MPa | 10.0 | 17.2 | 21.2 | 18.9 | 21.3 |
| | Elongation at break (EB) | | % | 400 | 353 | 355 | 292 | 240 |
| | Dynamic modulus of elasticity (E' (30° C.)) | | MPa | 3.5 | 28 | 113 | 14 | 88 |
| | Dynamic modulus of elasticity (E' (200° C.)) | | MPa | 3.5 | 20 | 42 | 10 | 48 |
| | Volume resistivity | | ohms·cm | >$10^{14}$ | >$10^{14}$ | $8.8 \times 10^{-1}$ | >$10^{14}$ | $3.8 \times 10^{0}$ |
| | Evaluation of electrical insulating properties | | | Good | Good | Bad | Good | Bad |

TABLE 5

|  |  |  |  | Comparative Example 6 | Comparative Example 7 | Comparative Example 8 | Comparative Example 9 |
|---|---|---|---|---|---|---|---|
| Estramer | Type | | | EPDM | EPDM | EPDM | EPDM |
| Carbon nanofibers | Type | | | — | S | SO | SH |
| Carbon fiber composite material | Composition | Estramer | Phr | 100 | 100 | 100 | 100 |
| | | Carbon nanofibers | phr | 0 | 20 | 20 | 20 |
| Pulsed NMR measurement results for uncrosslinked form | Raw material | T2n (30° C.) | μsec | 520 | 520 | 520 | 520 |
| | Carbon fiber composite material | T2n (150° C.) | μsec | 2200 | 1800 | 700 | 1100 |
| | | fnn (150° C.) | | 0.23 | 0.18 | 0.11 | 0.05 |
| | | T2s (150° C.) | μsec | 860 | 290 | 290 | 410 |
| Properties of crosslinked carbon fiber composite material | Hardness JIS A | | | 56 | 72 | 75 | 71 |
| | 100% modulus (M100) | | MPa | 1.4 | 1.9 | 5.6 | 3.9 |
| | Tensile strength (TB) | | MPa | 1.9 | 5.5 | 7.5 | 6.2 |
| | Elongation at break (EB) | | % | 130 | 295 | 175 | 225 |
| | Dynamic modulus of elasticity (E' (30° C.)) | | MPa | 3.6 | 27 | 17 | 23 |
| | Dynamic modulus of elasticity (E' (200° C.)) | | MPa | 4.7 | 11 | 17 | 16 |
| | Volume resistivity | | ohms·cm | >$10^{14}$ | $5.2 \times 10^{1}$ | $3.3 \times 10^{2}$ | $2.6 \times 10^{2}$ |
| | Evaluation of electrical insulating properties | | | Good | Bad | Bad | Bad |

As is clear from the results shown in Tables 2 to 5, the crosslinked carbon fiber composite materials of Examples 1 and 2 containing the fourth carbon nanofibers had a high volume resistivity (i.e., exhibited excellent electrical insulating properties) as compared with the carbon fiber composite materials of Comparative Examples 1 to 5, even if a large amount of fourth carbon nanofibers were used. The crosslinked carbon fiber composite materials of Examples 3 to 8 containing the fourth carbon nanofibers had a high volume resistivity (i.e., exhibited excellent electrical insulating properties) as compared with the carbon fiber composite materials of Comparative Examples 6 to 9, even if a large amount of fourth carbon nanofibers were used.

What is claimed is:

1. A method of producing a carbon fiber composite material comprising:
   a step (a) of heating first carbon nanofibers produced by a vapor growth method at a temperature that is within the range of 1100 to 1600° C. and is higher than a reaction temperature employed in the vapor growth method to obtain second carbon nanofibers;
   a step (b) of subjecting the second carbon nanofibers to a mechanical process to reduce the number of branch points of the second carbon nanofibers to obtain third carbon nanofibers;
   a step (c) of heating the third carbon nanofibers at 600 to 800° C. in an oxygen-containing atmosphere to obtain oxidized fourth carbon nanofibers; and
   a step (d) of mixing the fourth carbon nanofibers into an elastomer, and uniformly dispersing the fourth carbon nanofibers in the elastomer by applying a shear force to obtain a carbon fiber composite material; wherein:
   the step (a) and the step (c) omit (i) a heating treatment ranging from 2000° C. to 3200° C. and (ii) a graphitization step.

2. The method of producing a carbon fiber composite material according to claim 1, wherein the heating temperature in the step (a) is 1200 to 1500° C.

3. The method of producing a carbon fiber composite material according to claim 1, wherein the third carbon nanofibers obtained by the step (b) have a maximum fiber length of less than 20 μm.

4. The method of producing a carbon fiber composite material according to claim 1, wherein the mechanical process in the step (b) is implemented by a compression process, and the third carbon nanofibers obtained by the compression process do not have a branch point.

5. The method of producing a carbon fiber composite material according to claim 4, wherein the compression process is performed by supplying the second carbon nanofibers to a space between at least two rotating rolls, and applying a shear force and a compressive force to the second carbon nanofibers.

6. The method of producing a carbon fiber composite material according to claim 4, wherein the compression process does not use a binder for binding the carbon nanofibers.

7. The method of producing a carbon fiber composite material according to claim 4, wherein the compression process is performed by using a dry compression granulator.

8. The method of producing a carbon fiber composite material according to claim 1, wherein the mechanical process in the step (b) is implemented by a grinding process, and the third carbon nanofibers have a tap density higher than that of the second carbon nanofibers by a factor of 1.5 to 10.

9. The method of producing a carbon fiber composite material according to claim 8, wherein the third carbon nanofibers obtained by the grinding process have a specific surface area by nitrogen adsorption larger than that of the second carbon nanofibers by a factor of 1.1 to 5.0.

10. The method of producing a carbon fiber composite material according to claim 8, wherein the grinding process is a dry grinding process that utilizes an impact and/or a shear force.

11. The method of producing a carbon fiber composite material according to claim 1, wherein the surface oxygen concentration of the fourth carbon nanofibers measured by X-ray photoelectron spectroscopy (XPS) is higher than that of the third carbon nanofibers in an amount of 0.5 to 2.6 atm %.

12. The method of producing a carbon fiber composite material according to claim 1, wherein the surface oxygen concentration of the fourth carbon nanofibers measured by X-ray photoelectron spectroscopy (XPS) is higher than that of the third carbon nanofibers by 20 to 120%.

13. The method of producing a carbon fiber composite material according to claim 1, wherein the heating process in the step (c) reduces the mass of the third carbon nanofibers by 2 to 20% to obtain the fourth carbon nanofibers.

14. The method of producing a carbon fiber composite material according to claim 1, wherein the fourth carbon nanofibers obtained by the step (c) have a surface oxygen concentration measured by X-ray photoelectron spectroscopy (XPS) of 2.6 to 4.6 atm %.

15. The method of producing a carbon fiber composite material according to claim 1, wherein the fourth carbon nanofibers obtained by the step (c) have a ratio (D/G) of a peak intensity D at around 1300 $cm^{-1}$ to a peak intensity G at around 1600 cm measured by Raman scattering spectroscopy of 0.12 to 0.22.

16. The method of producing a carbon fiber composite material according to claim 1, wherein the fourth carbon nanofibers obtained by the step (c) have a specific surface area by nitrogen adsorption of 45 to 60 $m^2/g$.

17. The method of producing a carbon fiber composite material according to claim 1, wherein the fourth carbon nanofibers obtained by the step (c) have an average diameter of 70 to 100 nm.

* * * * *